(12) United States Patent
Koganezawa

(10) Patent No.: US 7,826,006 B2
(45) Date of Patent: Nov. 2, 2010

(54) DISPLAY DEVICE

(75) Inventor: Nobuyuki Koganezawa, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 139 days.

(21) Appl. No.: 12/230,779

(22) Filed: Sep. 4, 2008

(65) Prior Publication Data

US 2009/0059126 A1    Mar. 5, 2009

(30) Foreign Application Priority Data

Sep. 5, 2007    (JP) ............... 2007-229890

(51) Int. Cl.
*G02F 1/1335* (2006.01)
(52) U.S. Cl. ............... 349/64; 349/61; 349/56
(58) Field of Classification Search ............ 349/64, 349/60, 61, 201, 193, 158, 56, 58, 62, 112, 349/113; 362/225, 611, 216, 612
See application file for complete search history.

(56) References Cited

U.S. PATENT DOCUMENTS

| | | | | |
|---|---|---|---|---|
| 6,332,690 B1 * | 12/2001 | Murofushi | ............... | 362/611 |
| 7,609,355 B2 * | 10/2009 | Nouchi et al. | ............... | 349/155 |
| 7,667,786 B2 * | 2/2010 | Nouchi et al. | ............... | 349/58 |
| 2004/0130912 A1 * | 7/2004 | Miyashita | ............... | 362/561 |
| 2007/0069978 A1 * | 3/2007 | Daiku | ............... | 345/8 |
| 2007/0146569 A1 * | 6/2007 | Nouchi et al. | ............... | 349/58 |
| 2008/0303976 A1 * | 12/2008 | Nishizawa et al. | ............... | 349/64 |
| 2009/0059126 A1 * | 3/2009 | Koganezawa | ............... | 349/64 |

FOREIGN PATENT DOCUMENTS

| JP | 08-286174 | 11/1996 |
|---|---|---|
| JP | 2006-106079 | 4/2006 |

* cited by examiner

*Primary Examiner*—Brian M Healy
(74) *Attorney, Agent, or Firm*—Stites & Harbison PLLC; Juan Carlos A. Marquez, Esq.

(57) ABSTRACT

A panel unit is formed by sandwiching a liquid crystal display panel and a diffusion sheet between a front surface plate having a curved plane and a back surface plate having a curved plane. A light source unit is arranged on a back surface of the panel unit. The diffusion sheet is formed in to an outward convex shape in the same manner as the liquid crystal display panel and hence, due to a lens action of the diffusion sheet, light from the light source unit is collected in the direction toward the center of a screen. Accordingly, it is possible to suppress a phenomenon that brightness in a periphery of the screen is reduced when the screen is viewed from a front side.

6 Claims, 21 Drawing Sheets

DISPLAY DEVICE

BACKGROUND OF THE INVENTION

1. Field of the Invention

The present invention relates to a liquid crystal display device, and more particularly to a liquid crystal display device having a curved display screen.

2. Background Art

Thanks to several characteristics of a liquid crystal display device such as the reduction of thickness of the display device and the reduction of weight of the display device, a demand for a liquid crystal display device has been spreading to various applications ranging from a computer display, a mobile phone terminal or the like to a television receiver set. It is also one of the characteristics of the liquid crystal display device that the liquid crystal display device has a planar screen.

From a viewpoint that a liquid crystal display device can be made thinner, the liquid crystal display device has a possibility of being installed at various places. The installation place of the liquid crystal display device is not limited to a planar plane and there has been also a demand for installation of the liquid crystal display device on a place which has a curved plane. As such an installation place which has a curved plane, for example, a pillar having a circular cross section, a wall surface of a train or a bus or the like is named. Further, there also exists a case in which it is necessary to form a display device per se in a curved plane. For example, a pachinko machine, a slot machine gaming machine, and various gaming machines installed in a gaming arena are named. In an attempt to use a liquid crystal display device as a display of such a gaming machine, it is necessary to form the liquid crystal display device in a curved plane.

However, the manufacture of the liquid crystal display panel using a curved glass substrate or the like is extremely difficult. Accordingly, a flat liquid crystal display panel is firstly manufactured using a flat glass substrate and, thereafter, the liquid crystal display panel is curved. Here, an operation for uniformly forming the flat liquid crystal display panel in a curved plane requires a special technique.

JP-A-8-286174 (Patent document 1) discloses a technique which forms the liquid crystal display panel in a curved plane using a particular polarizer to be adhered to a flat liquid crystal display panel formed using a glass substrate. That is, by adhering the polarizer which is curved along an absorption axis of the polarizer when the polarizer is heated or moistened, the liquid crystal display panel is curved.

JP-2006-106079 (Patent document 2) discloses a technique which, in curving the flat liquid crystal display panel, a uniaxial stretching film is adhered to a recessed surface side of the liquid crystal display panel and leaves the liquid crystal display panel in an atmosphere of a temperature of 40° C. to 200° C. for 10 minutes to 24 hours so as to curve the flat liquid crystal display panel. That is, the liquid crystal display panel is curved by making use of shrinkage of the uniaxial stretching film in the stretching direction.

SUMMARY OF THE INVENTION

A liquid crystal display device has viewing angle dependency due to a property of liquid crystal. That is, the liquid crystal display device exhibits a phenomenon that when a flat liquid crystal display screen is viewed in the direction displaced from the vertical line, brightness of the liquid crystal display screen is lowered or a hue of the liquid crystal display screen is changed. Although this phenomenon is alleviated in an IPS (In Plane Switching) type liquid crystal display device which controls liquid crystal molecules using an electric field in the lateral direction or the like, the phenomenon is not completely eliminated.

In this manner, even the flat liquid crystal display panel has the viewing angle dependency and hence, when a screen is formed in a curved plane, this viewing angle dependency becomes more conspicuous. For example, when the screen is formed into a convex shape, light radiated from a backlight and passes through a periphery of the screen is directed outwardly. Accordingly, when the periphery of the screen is viewed from the center of the screen, the viewing angle dependency of the liquid crystal and the phenomenon that the light radiated from the backlight is directed outwardly overlap with each other thus giving rise to a drawback that the periphery of the screen is darkened.

Neither patent document 1 nor patent document 2 discloses or suggests this problem on image quality. Accordingly, it is an object of the present invention to provide a means which can cope with the phenomenon that the periphery of the screen is darkened when the liquid crystal display device is viewed from a front side in the backlight-type liquid crystal display device having a curved plane.

The present invention is directed to a liquid crystal display device which includes: a liquid crystal display panel; a diffusion plate; and a plurality of light sources, wherein a panel unit is formed of the liquid crystal display panel which is formed into an outward convex shape and a diffusion sheet which is formed into an outward convex shape, the diffusion plate is arranged over a back surface of the panel unit, the plurality of light sources is arranged over a back surface of the diffusion plate, and the diffusion sheet is curved along a back surface of the liquid crystal display panel.

The present invention is also directed to a liquid crystal display device which includes: a liquid crystal display panel; a diffusion plate; and a plurality of light sources, wherein the liquid crystal display panel which is formed into an outward convex shape is provided with a diffusion sheet which is formed into an outward convex shape and is arranged over a back surface of the display panel, the diffusion plate is arranged over a back surface of the diffusion sheet, the plurality of light sources is arranged over a back surface of the diffusion plate, and a radius of curvature of the diffusion sheet is larger than a radius of curvature of the liquid crystal display panel.

The present invention is also directed to a liquid crystal display device which includes: a liquid crystal display panel; a diffusion plate; and a plurality of light sources, wherein the liquid crystal display panel and the diffusion sheet are sandwiched between a front surface plate which is formed into an outward convex shape and a Fresnel lens which is formed into an outward convex shape, the diffusion plate is arranged over a back surface of the Fresnel lens, the plurality of light sources is arranged over a back surface of the diffusion plate, and the liquid crystal display panel, the diffusion sheet and the Fresnel lens have radius of curvature equal to each other.

The present invention is also directed to a liquid crystal display device which includes: a liquid crystal display panel; a diffusion plate; and a plurality of light sources, wherein a panel unit is formed of the liquid crystal display panel which is formed into an outward concave shape and a diffusion sheet which is formed into an outward concave shape, the diffusion plate is arranged over a back surface of the panel unit, the plurality of light sources is arranged over a back surface of the diffusion plate, and the diffusion sheet is curved along a back surface of the liquid crystal display panel.

The present invention is also directed to a liquid crystal display device which includes: a liquid crystal display panel; a diffusion plate; and a plurality of light sources, wherein the liquid crystal display panel which is formed into an outward concave shape is provided with a diffusion sheet which is formed into an outward concave shape and is arranged over a back surface of the display panel, the diffusion plate is arranged over a back surface of the diffusion sheet, the plurality of light sources is arranged over a back surface of the diffusion plate, and a radius of curvature of the diffusion sheet is smaller than a radius of curvature of the liquid crystal display panel.

DESCRIPTION OF THE PREFERRED EMBODIMENT

Figure 1:
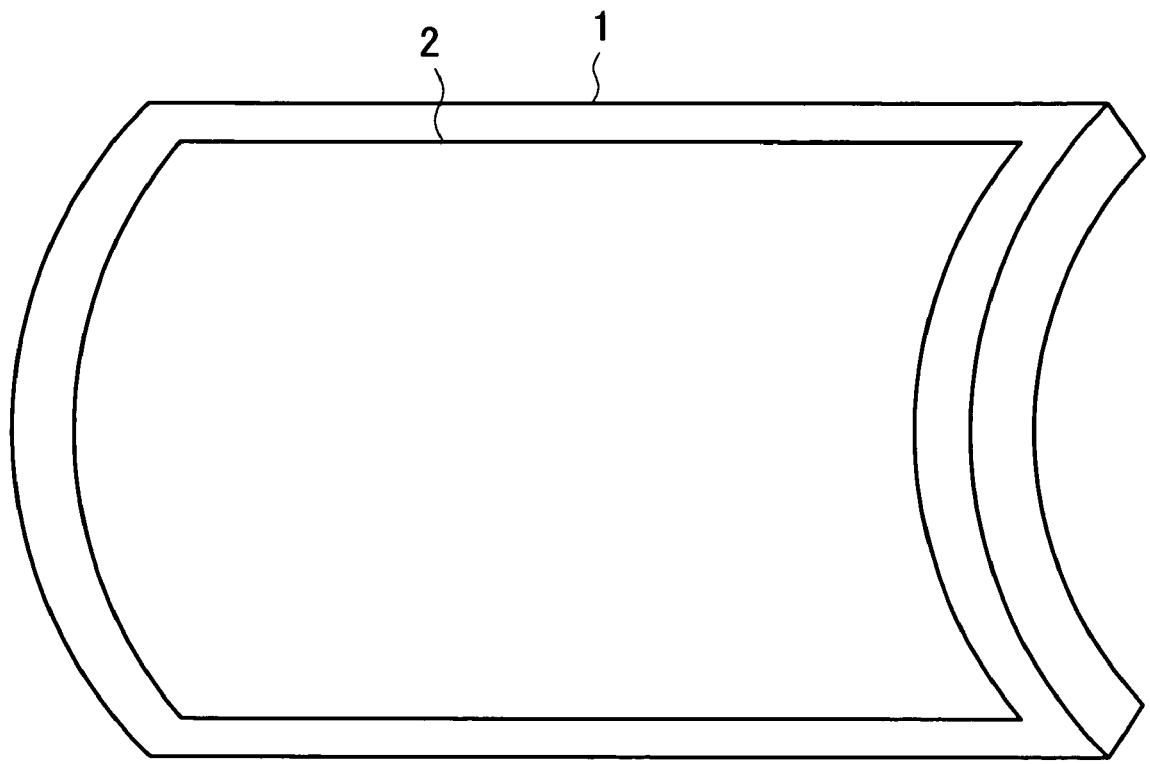
FIG. 1 is a view showing the appearance of a curved plane display.

According to the present invention, in forming a screen of a liquid crystal display panel into an outward convex shape, by also forming a diffusion sheet in an outward convex shape, light radiated from a backlight which passes through a periphery of the screen is directed in the normal direction of the screen due to a lens action of the diffusion sheet. Further, by changing a radius of curvature of the diffusion sheet relative to a radius of curvature of the liquid crystal display panel, the brightness in the screen normal direction can be controlled.

Further, according to the present invention, the brightness in the screen normal direction is controlled based on a curvature of the diffusion plate or an arrangement method of fluorescent lamps which constitute a light source. Further, besides the formation of the diffusion sheet and the diffusion plate into an optimum curved plane, the brightness of the screen in the screen normal direction can be further enhanced with the provision of a Fresnel lens having a curved plane.

Even when the screen of the liquid crystal display panel is formed into an outward concave shape, it is possible to enhance the brightness of the periphery of the screen as viewed from a front side by adjusting the curvature of the diffusion sheet or the arrangement of the fluorescent lamps. To explain specific means or constitutions, they are as follows.

(1) The present invention is directed to a liquid crystal display device which includes: a liquid crystal display panel; a diffusion plate; and a plurality of light sources, wherein a panel unit is formed of the liquid crystal display panel which is formed into an outward convex shape and a diffusion sheet which is formed into an outward convex shape, the diffusion plate is arranged over a back surface of the panel unit, the plurality of light sources is arranged over a back surface of the diffusion plate, and the diffusion sheet is curved along a back surface of the liquid crystal display panel.

(2) In the liquid crystal display device having the constitution (1), the diffusion plate is formed in plane.

(3) In the liquid crystal display device having the constitution (1), the diffusion plate has curved surface formed into a concave shape as viewed from the outside of a screen.

(4) In the liquid crystal display device having the constitution (1), the plurality of light sources is arranged in plane.

(5) In the liquid crystal display device having the constitution (1), the plurality of light sources is arranged along curved surface, and the curved plane is recessed as viewed from the outside of a screen.

(6) The present invention is also directed to a liquid crystal display device which includes: a liquid crystal display panel; a diffusion plate; and a plurality of light sources, wherein the liquid crystal display panel which is formed into an outward convex shape is provided with a diffusion sheet which is formed into an outward convex shape and is arranged over a back surface of the display panel, the diffusion plate is arranged over a back surface of the diffusion sheet, the plurality of light sources is arranged over a back surface of the diffusion plate, and a radius of curvature of the diffusion sheet is larger than a radius of curvature of the liquid crystal display panel.

(7) In the liquid crystal display device having the constitution (6), the plurality of light sources is arranged in plane.

(8) In the liquid crystal display device having the constitution (6), the plurality of light sources is arranged along curved surface, and the curved plane is recessed as viewed from the outside of a screen.

(9) The present invention is also directed to a liquid crystal display device which includes: a liquid crystal display panel; a diffusion plate; and a plurality of light sources, wherein the liquid crystal display panel and the diffusion sheet are sandwiched between a front surface plate which is formed into an outward convex shape and a Fresnel lens which is formed into an outward convex shape, the diffusion plate is arranged over a back surface of the Fresnel lens, the plurality of light sources is arranged over a back surface of the diffusion plate, and the liquid crystal display panel, the diffusion sheet and the Fresnel lens have radius of curvature equal to each other.

(10) In the liquid crystal display device having the constitution (9), the plurality of light sources is arranged in plane.

(11) In the liquid crystal display device having the constitution (9), the plurality of light sources is arranged along curved surface, and the curved plane is recessed as viewed from the outside of a screen.

(12) The present invention is also directed to a liquid crystal display device which includes: a liquid crystal display panel; a diffusion plate; and a plurality of light sources, wherein a panel unit is formed of the liquid crystal display panel which is formed into an outward concave shape and a diffusion sheet which is formed into an outward concave shape, the diffusion plate is arranged over a back surface of the panel unit, the plurality of light sources is arranged over a back surface of the diffusion plate, and the diffusion sheet is curved along a back surface of the liquid crystal display panel.

(13) In the liquid crystal display device having the constitution (12), the plurality of light sources is arranged in plane.

(14) In the liquid crystal display device having the constitution (12), the plurality of light sources is arranged in a curved plane, and the curved plane is recessed as viewed from the outside of a screen.

(15) The present invention is also directed to a liquid crystal display device which includes: a liquid crystal display panel; a diffusion plate; and a plurality of light sources, wherein the liquid crystal display panel which is formed into an outward concave shape is provided with a diffusion sheet which is formed into an outward concave shape and is arranged over a back surface of the display panel, the diffusion plate is arranged over a back surface of the diffusion sheet, the plurality of light sources is arranged over a back surface of the diffusion plate, and a radius of curvature of the diffusion sheet is smaller than a radius of curvature of the liquid crystal display panel.

(16) In the liquid crystal display device having the constitution (15), the plurality of light sources is arranged in plane.

(17) In the liquid crystal display device having the constitution (15), the plurality of light sources is arranged along curved surface, and the curved plane is recessed as viewed from the outside of a screen.

According to the present invention, in the liquid crystal display panel having the screen which is formed into an outward convex shape, a curvature of the diffusion sheet is set such that the diffusion sheet has the curved surface which is formed in an outward convex shape in the same manner as the liquid crystal display panel and hence, it is possible to suppress the reduction of brightness in the periphery of the screen when the screen is viewed from a front side. Further, by making a radius of curvature of the diffusion sheet different from a radius of curvature of the liquid crystal display panel, it is possible to control the reduction of brightness in the periphery of the screen when the screen is viewed from a front side to a predetermined value.

Further, by controlling the curved plane of the diffusion plate arranged on back surfaces of the liquid crystal display panel and the diffusion sheet and the curved surface along which the plurality of light sources are arranged, it is possible to control the reduction of brightness in the periphery of the screen when the screen is viewed from a front side to a predetermined value or less. Further, it is possible to acquire an advantageous effect similar to such an advantageous effect by providing the Fresnel lens having a curved plane.

Further, also in the liquid crystal display panel having the screen which is formed into an outward concave shape, by changing the curved surface of the diffusion sheet or the curved plane along which the light source is arranged, it is possible to control the reduction of brightness in the periphery of the screen when the screen is viewed from a front side to a predetermined value.

The present invention is explained in detail in conjunction with embodiments.

Embodiment 1

FIG. 1 is a view showing the appearance of a display device of the embodiment 1. FIG. 1 shows a liquid crystal display device having an outward convex screen. The screen has a diagonal length of 9 inches and a radius of curvature R of 115 mm. Such a display device is used for amusement, that is, for a slot gaming machine, various kinds of gaming machines installed in a game arena or the like, for example. In FIG. 1, a display region 2 of the liquid crystal display device is formed into an outwardly curved plane. Such a liquid crystal display device can be obtained by forming a flat liquid crystal display panel 10 formed by using a flat-shaped substrate in a curved plane.

The liquid crystal display panel 10 is constituted of a TFT substrate on which pixel electrodes, thin film transistors (TFT) and the like are formed, and a color filter substrate on which color filters and the like are formed corresponding to the pixel electrodes, wherein the TFT substrate and the color filter substrate are arranged to face each other with a gap of several μm therebetween and liquid crystal is filled in the gap. Due to a control of the liquid crystal by changing voltages applied to respective pixels, transmissivity of light radiated from a backlight is changed thus forming an image. It is necessary to polarize the light to control the transmission of light by the liquid crystal and hence, a lower polarizer is adhered to a lower portion of the liquid crystal display panel 10 and an upper polarizer is adhered to an upper portion of the liquid crystal display panel 10.

In this embodiment, the flat liquid crystal display panel 10 is formed into a curved plane by sandwiching the liquid crystal display panel 10 between a front surface plate 14 and a back surface plate 15 which respectively have a curved plane. To form the flat liquid crystal display panel 10 into a curved plane by the front surface plate 14 and the back surface plate 15, it is necessary to set the rigidity of the liquid crystal display panel 10 to a small value. To set the rigidity of the liquid crystal display panel 10 to a small value, it is necessary to make a glass substrate of the liquid crystal display panel 10 thin.

A thickness of the glass substrate for constituting the liquid crystal display panel 10 is standardized to 0.5 mm or 0.7 mm, for example. When an extremely thin glass substrate is used, the rigidity of the glass substrate becomes extremely small and hence, the manufacture of a liquid crystal display panel becomes difficult. Further, a manufacturing device of the liquid crystal display panel 10 is also provided in conformity with the standardized glass substrate. Accordingly, to decrease a thickness of the liquid crystal display panel so that the liquid crystal display panel 10 can be curved, after manufacturing the liquid crystal display panel 10, a surface of the liquid crystal display panel 10 is mechanically or chemically polished. The total thickness of the liquid crystal display panel 10 can be set to a desired value by controlling a polishing quantity.

Figure 2A:
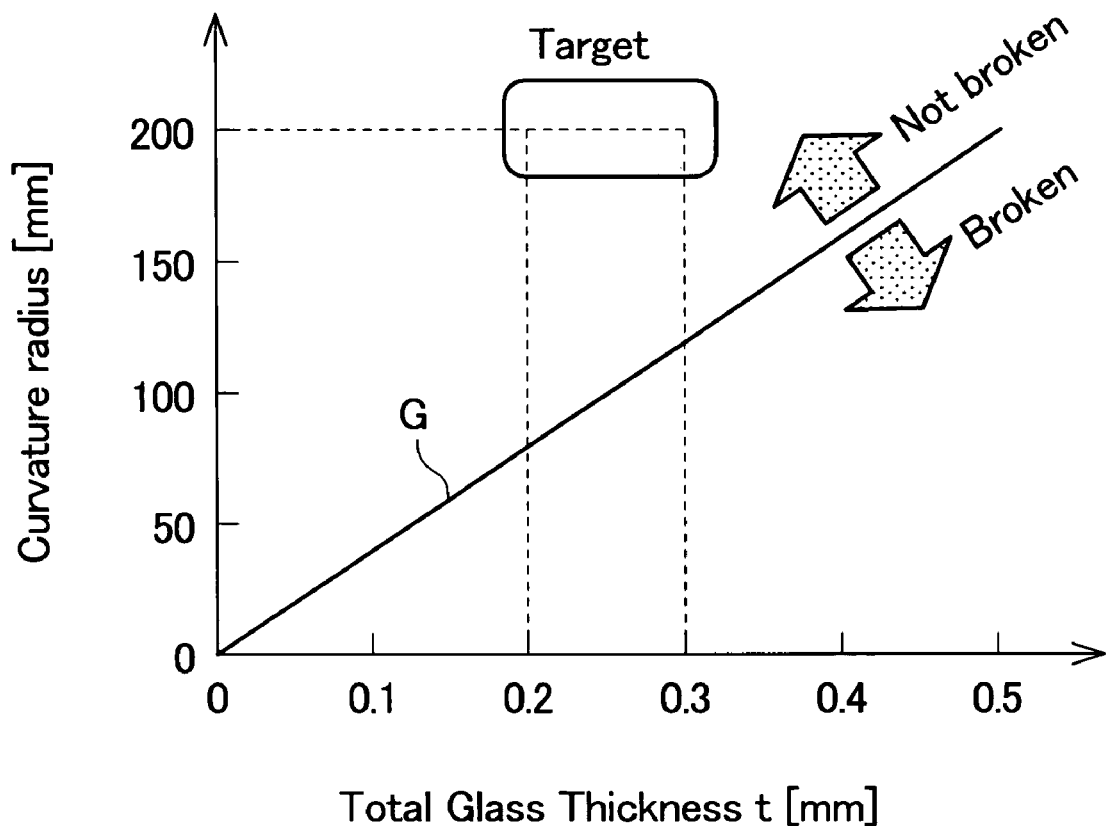
FIG. 2A is a graph showing the relationship between a curvature and a thickness of a glass substrate.
Figure 2B:
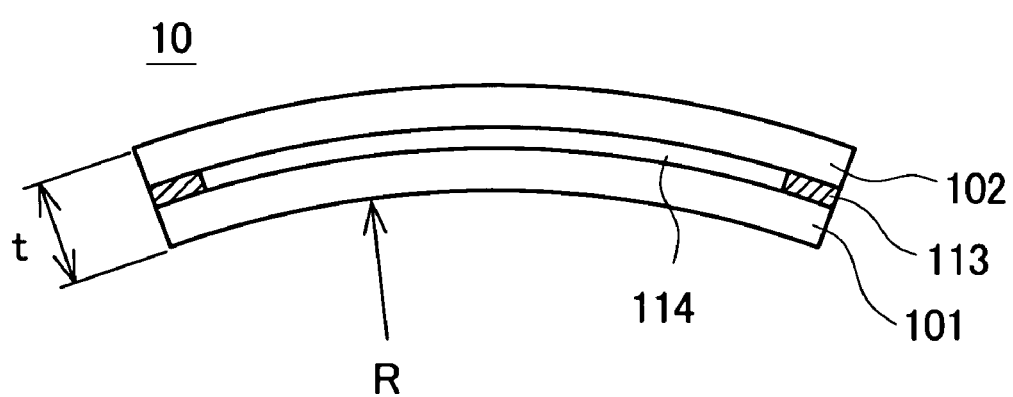
FIG. 2B is a view showing parameters used in FIG. 2A.

The degree of curvature of the liquid crystal display panel 10 by bending is determined depending on a total thickness of the liquid crystal display panel 10. Here, a thickness of the liquid crystal display panel 10 is a total thickness of two glass substrates. FIG. 2A is a graph showing the relationship between the plate thickness of the liquid crystal display panel 10 and a range within which the glass can be bent without being broken. FIG. 2B is a view showing parameters used for determining the relationship in FIG. 2A. As shown in FIG. 2B, the liquid crystal display panel 10 includes a TFT substrate 101 on which TFTs and pixel electrodes are formed, a color filter substrate 102 on which color filters and the like are formed, and liquid crystal which is sandwiched between the TFT substrate 101 and the color filter substrate 102. Further, the liquid crystal is sealed in a space defined between the TFT substrate 101 and the color filter substrate 102 using a sealing material 113.

A thickness of the glass substrate which constitutes the liquid crystal display panel 10 is standardized to 0.7 mm or 0.5 mm, for example. Accordingly, to reduce a thickness of the glass substrate for acquiring a larger curvature, after forming the liquid crystal display panel 10, an outer side of the glass substrate is polished so as to reduce the thickness of the glass substrate. The glass substrate can be polished either by mechanical polishing or by chemical polishing or by using both polishing. In this case, both of the TFT substrate 101 and the color filter substrate 102 are polished. Since a thickness of a liquid crystal layer 114 is several μm, to consider a total thickness t of the liquid crystal display panel 10, the thickness of the liquid crystal layer 114 can be ignored.

In FIG. 2A, a radius of curvature of the liquid crystal display panel 10 is taken on an axis of ordinates. The radius of curvature is, as shown in FIG. 2B, defined as a radius of curvature of an inner side of the liquid crystal display panel 10. A glass thickness taken on an axis of abscissas in FIG. 2A indicates a total thickness t of the liquid crystal display panel 10. That is, in FIG. 2A, when the total glass thickness taken on an axis of abscissas is 0.2 mm, the thickness of the TFT substrate 101 or the thickness of the color filter substrate 102 is 0.1 mm.

In FIG. 2A, a straight line G indicates a rupture limit line of the glass. That is, when the relationship between the radius of curvature and the total glass thickness exists below the straight line G, the glass substrate is broken, while when the relationship between the radius of curvature and the total glass thickness exists on or above the straight line G, the glass substrate is not broken. Assuming the radius of curvature as R and the thickness of the liquid crystal display panel as t, the straight line G assumes the relationship of R=400 t. That is, when the radius of curvature R becomes equal to or less than 400 times as large as the thickness t, the glass substrate is broken. However, with the presence of flaws or the like in the glass substrate, even when the relationship between the radius of curvature and the total glass thickness t exists slightly above the straight line G, the glass is broken. Accordingly, it is desirable that the tolerance twice as large as the straight line G is imparted to an actual product, and the product is used on the straight line which satisfies the relationship of R=800 t or in a region above such a straight line. In the actual product, the relationship between the total glass thickness of the glass substrate and the radius of curvature is set above the straight line G with sufficient tolerance as shown in FIG. 2A.

A radius of curvature of the screen of the liquid crystal display panel 10 according to this embodiment is 115 mm. A total thickness of the liquid crystal display panel 10 is 0.16 mm. That is, a plate thickness of the TFT substrate or the color filter substrate is 0.08 mm. As shown in FIG. 2A, with the plate thickness of the liquid crystal display panel 10 of this embodiment, it is possible to achieve the radius of curvature of 115 mm with a margin. In this embodiment, the thickness of the glass substrate is decreased by chemical polishing using a hydrofluoric acid.

Figure 3:
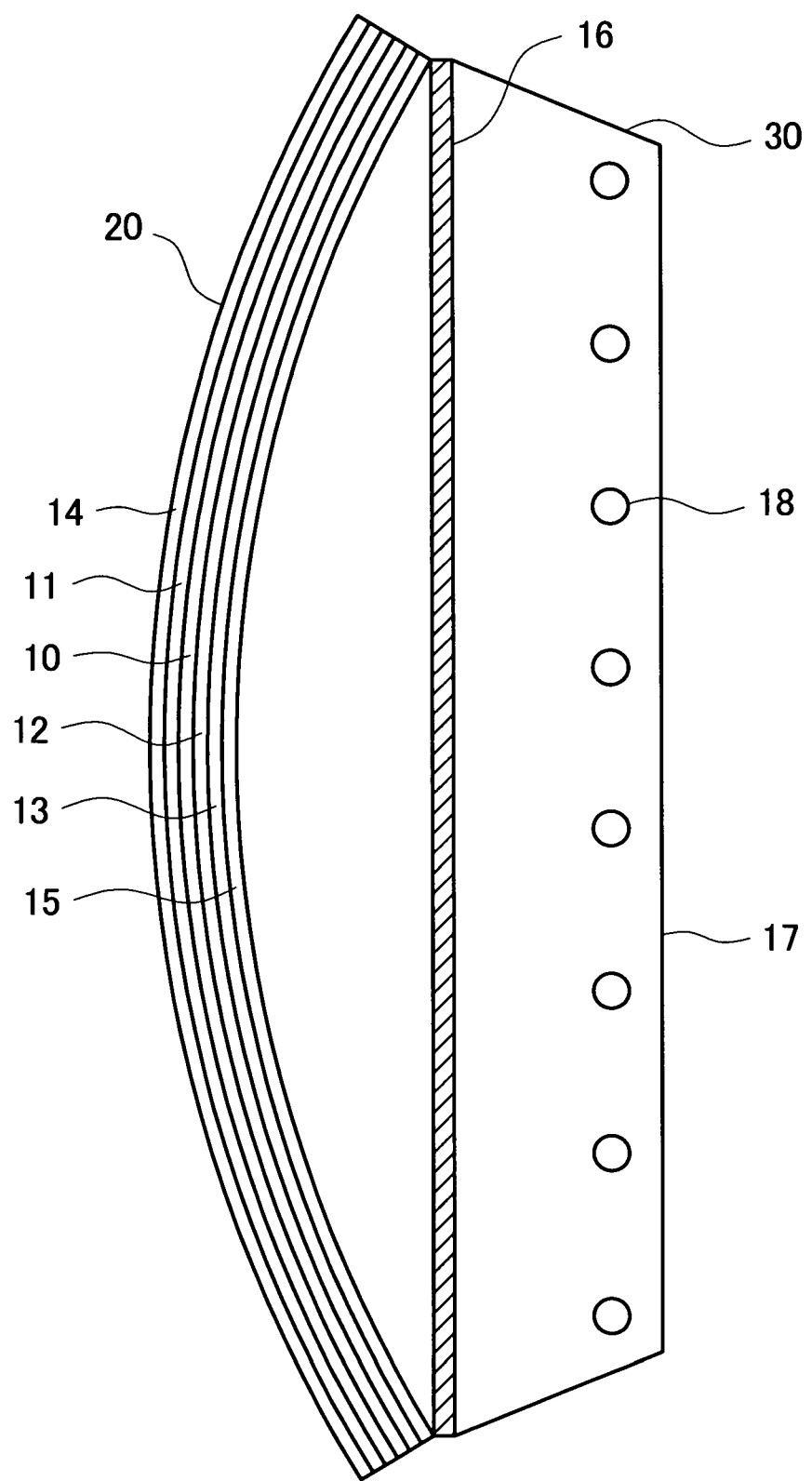
FIG. 3 is a cross-sectional view of a liquid crystal display device of an embodiment 1.

FIG. 3 is a schematic cross-sectional view of the display device of the embodiment 1 of the present invention. In FIG. 3, an upper polarizer 11 is adhered to an upper side of the liquid crystal display panel 10, and a lower polarizer 12 is adhered to a lower side of the liquid crystal display panel 10. As shown in FIG. 2B, the liquid crystal display panel 10 is constituted of the TFT substrate, the color filter substrate, and the liquid crystal sealed between the TFT substrate and the color filter substrate. A diffusion sheet 13 is arranged below the lower polarizer 12. The liquid crystal display panel 10, the upper polarizer 11, the lower polarizer 12 and the diffusion sheet 13 are sandwiched between the front surface plate 14 and the back surface plate 15.

The front surface plate 14 is made of PET and has a plate thickness of approximately 0.5 mm. The back surface plate 15 is made of acryl and has a plate thickness of 2 mm to 4 mm. The front surface panel 14 and the back surface plate 15 are formed in a curved plane with a predetermined curvature. The liquid crystal display panel 10 has a small total thickness of 0.16 mm. Further, both of the upper polarizer 11 and the lower polarizer 12 have a plate thickness of approximately 0.1 mm and a remade of a resin. The diffusion sheet 13 has a thickness of approximately 0.05 mm and is made of a resin. Accordingly, the liquid crystal display panel 10 and these optical parts have rigidities considerably smaller than rigidities of the front surface plate 14 and the back surface plate 15. As a result, when the front surface plate 14 and the back surface plate 15 are formed in a curved plane with a predetermined curvature, the liquid crystal display panel 10 and other optical parts are formed in conformity with the curvature of the front surface plate 14 and the back surface plate 15. The respective radius of curvature of the liquid crystal display panel and the optical parts have the same center. That is, the liquid crystal display panel and the optical parts are formed in a concentric cylindrical shape.

Figure 4A:
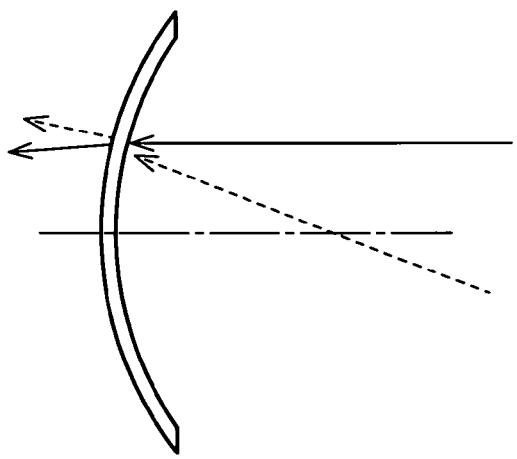
FIG. 4A is a view showing an example of refraction by a curved diffusion sheet, wherein the diffusion sheet has a small curvature.
Figure 4B:
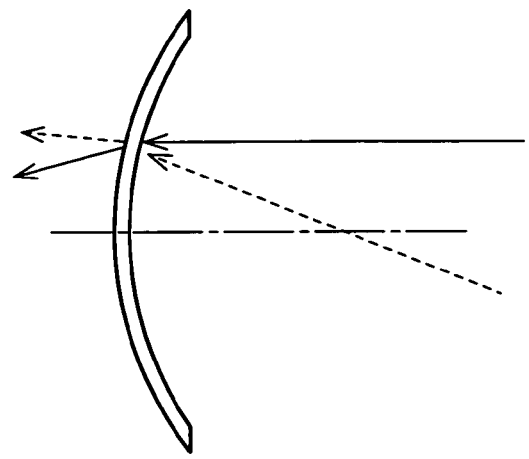
FIG. 4B is a view showing an example of refraction by a curved diffusion sheet, wherein the diffusion sheet has a large curvature.

In the present invention, the diffusion sheet 13 is curved in conformity with the curvature of the liquid crystal display panel 10. The diffusion sheet 13 is provided for making light radiated from the back light uniform by diffusion. In the present invention, by forming the diffusion sheet 13 in a curved plane, as shown in FIG. 4A and FIG. 4B, the diffusion sheet 13 also plays a role of directing the light radiated from the backlight in the direction toward the center of the screen. FIG. 4A shows a case in which the curvature of the diffusion sheet 13 is small, and FIG. 4B shows a case in which the curvature of the diffusion sheet 13 is large. That is, the larger the curvature of the diffusion sheet 13, an effect for directing the light radiated from the backlight toward the center of the screen is increased. In this embodiment, by forming the diffusion sheet 13 in a convex curved plane in the same manner as the liquid crystal display panel 10, the light radiated from the backlight is directed toward the center of the screen.

Figure 5:
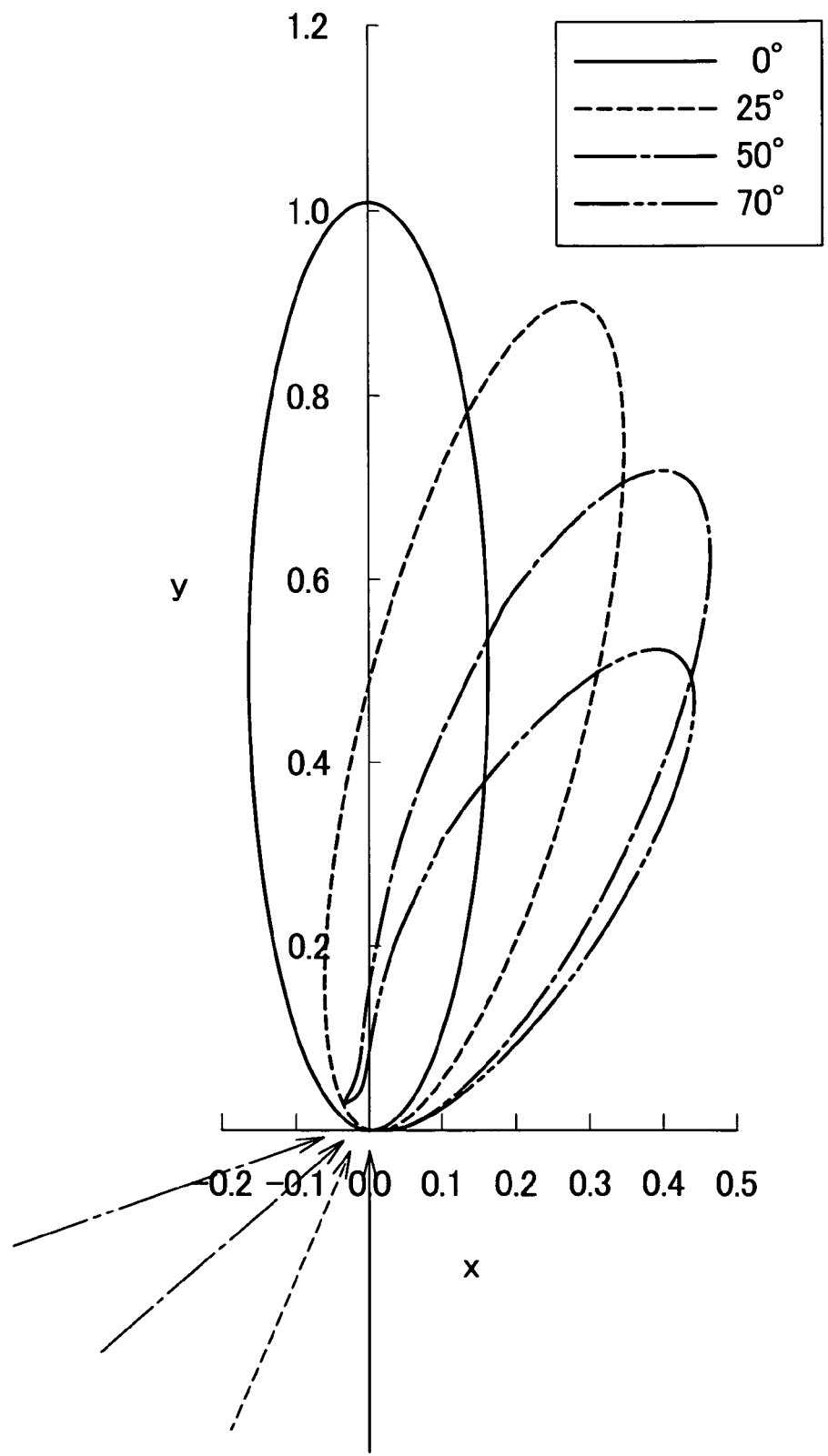
FIG. 5 is a view showing an example of transmissivity characteristic of the diffusion sheet.

FIG. 5 is a view showing a transmissivity characteristic of the diffusion sheet 13. In FIG. 5, the relative brightness is taken on an axis of ordinates y, and a diffusion surface, that is, the direction of the radiation light is taken on an axis of abscissas x. Scales on both of the y axis and the x axis in FIG. 5 are relative values. In FIG. 5, 0 degree indicated by a solid line shows a case in which the light is incident on the diffusion sheet 13 orthogonal to the diffusion sheet 13. 25 degrees indicated by a dotted line shows a case in which the light is incident on the diffusion sheet 13 in the direction inclined by 25 degrees from the direction orthogonal to the diffusion sheet 13. 50 degrees indicated by a chained line shows a case in which the light is incident on the diffusion sheet 13 in the direction inclined by 50 degrees from the direction orthogonal to the diffusion sheet 13. Further, 70 degrees indicated by a double-dashed chained line shows a case in which the light is incident on the diffusion sheet 13 in the direction inclined by 70 degrees from the direction orthogonal to the diffusion sheet 13.

In FIG. 5, when the incident angle is 0 degree, the direction of the incident light and the direction of the radiation light are equal to each other and hence, the radiation light receives only a diffusion effect by the diffusion sheet 13. A peak of the radiation light becomes smaller than a peak of the incident light. On the other hand, when the incident direction of the light is displaced from the direction orthogonal to the diffusion sheet 13, the radiation light receives the diffusion effect and, at the same time, the direction of the radiation light is changed. The change of the direction implies that the direction of the peak of the incident light and the direction of the peak of the radiation light are changed from each other.

Returning to FIG. 3, on a back surface of the panel unit 20 in which the liquid crystal display panel 10, the polarizers, the diffusion sheet 13 and the like are sandwiched between the front surface plate 14 and the back surface plate 15, a light source unit 30 including fluorescent lamps 18, a diffusion plate 16, a housing 17 and the like is arranged. In FIG. 3, the plurality of cold cathode ray tubes which constitute the light source are arranged in plane. The cold cathode ray tubes are arranged in the inside of the housing 17, and an inside of the housing 17 forms a reflection surface thus directing light from the cold cathode ray tubes to a liquid crystal display panel 10 side. In place of forming the inside of the housing 17 into the reflection surface, a reflection sheet may be arranged in the inside of the housing 17.

In FIG. 3, the diffusion plate 16 is arranged above the housing 17 which includes the fluorescent lamps 18. The diffusion plate 16 is provided for supplying the uniform light to the panel unit 20 by diffusing the light radiated from the light source. That is, the light source is constituted of the plurality of fluorescent lamps 18 and hence, when such constitution is directly adopted as it is, the brightness distribution consisting of portions where the fluorescent lamps are arranged and portions where the fluorescent lamps 18 are not arranged appears on the screen. The diffusion plate prevents such a phenomenon and plays a role of supplying the uniform light to the panel unit 20 from the light source unit 30. The light radiated from the diffusion plate 16 is formed into the further uniform light by the diffusion sheet 13 arranged in the inside of the panel unit 20. The diffusion plate 16 is formed of a poly-carbonate plate having a plate thickness of approximately 2 mm and hence, the diffusion plate 16 has enough rigidity.

According to this embodiment, even when the liquid crystal display panel 10 is formed in to a convex surface shape, by setting the curvature of the diffusion sheet 13 equal to the curvature of the liquid crystal display panel 10, it is possible to prevent lowering of the brightness particularly in the periphery of the screen when the screen is viewed in the screen normal direction. Further, according to this embodiment, the liquid crystal display device can acquire the above-mentioned effects while preventing the light source unit 30 from having the complicated constitution.

Embodiment 2

Figure 6A:
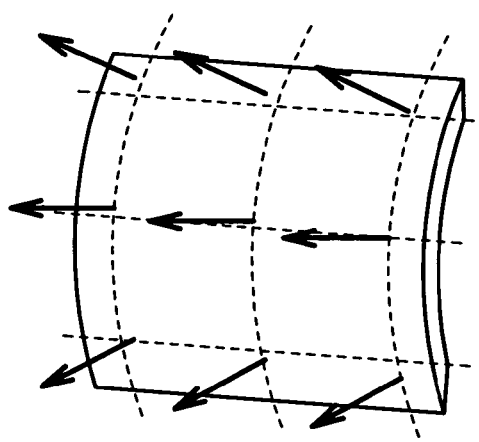
FIG. 6A is a schematic view when a radius of curvature of the liquid crystal display panel and a radius of curvature of the diffusion sheet are equal to each other.
Figure 6B:
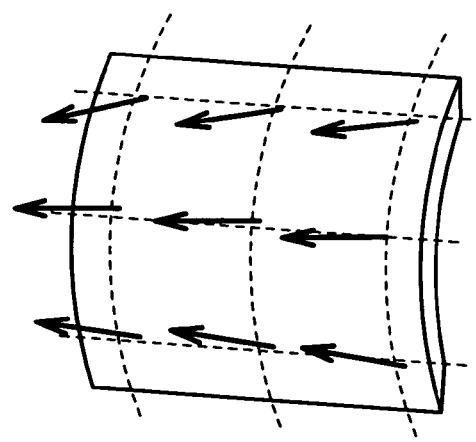
FIG. 6B is a schematic view when the radius of curvature of the diffusion sheet is smaller than the radius of curvature of the liquid crystal display panel.

As can be understood from FIG. 4A, FIG. 4B and FIG. 5, by forming the diffusion sheet 13 with the curvature, it is possible to change the brightness of the screen in the screen normal direction. FIG. 6A and FIG. 6B are schematic views showing the direction of the radiation light when the radius of curvature of the diffusion sheet 13 is changed. FIG. 6A shows a case in which a liquid crystal display panel 10 and the diffusion sheet 13 have the same radius of curvature as in the case of the embodiment 1, for example. FIG. 6B shows a case in which the radius of curvature of the diffusion sheet 13 is smaller than the radius of curvature of the liquid crystal display panel 10. That is, when it is necessary to increase the brightness in the screen normal direction, the radius of curvature of the diffusion sheet 13 may be decreased. On the other hand, when it is necessary to emphasize not only the brightness in the screen normal direction but also the brightness as viewed in the oblique direction, the curvature of the diffusion sheet 13 may be increased. That is, the radius of curvature of the diffusion sheet 13 may be selectively used depending on an application purpose.

Figure 7:
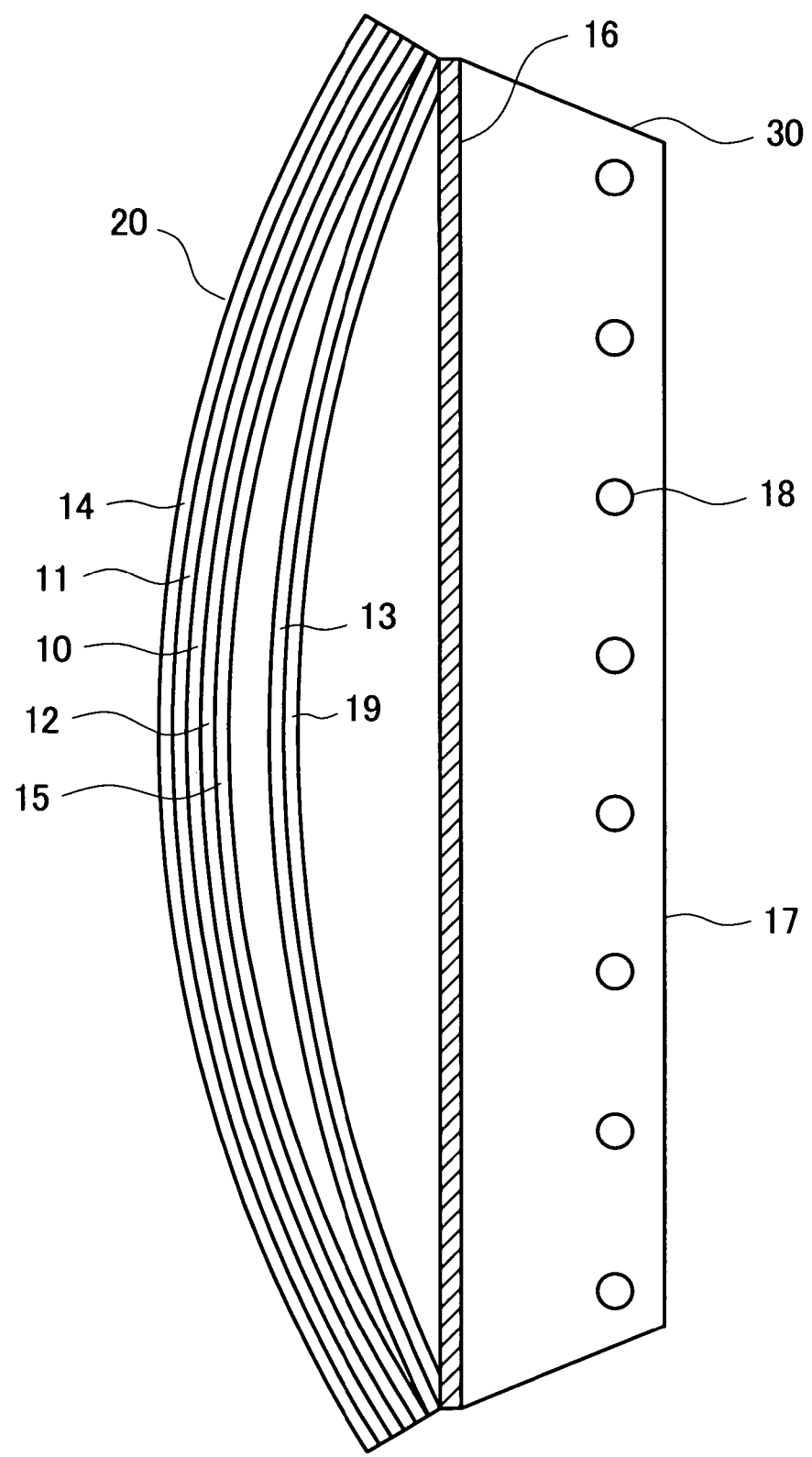
FIG. 7 is a cross-sectional view of a liquid crystal display device of an embodiment 2.

FIG. 7 is a view showing an embodiment 2 of the present invention. In FIG. 7, a panel unit 20 is configured such that a liquid crystal display panel 10, a lower polarizer 12 and an upper polarizer 11 are sandwiched between a front surface plate 14 and a back surface plate 15. In this embodiment, the panel unit 20 has the substantially same constitution as the panel unit 20 of the embodiment 1 except for that the panel unit 20 of this embodiment does not include a diffusion sheet 13. In this embodiment, the diffusion sheet 13 is provided separately from the panel unit 20.

In this embodiment, the diffusion sheet 13 is arranged on an auxiliary plate 19. The auxiliary plate 19 has the same constitution as a back surface plate 15 of the panel unit 20. That is, the auxiliary plate 19 is formed of an acrylic plate having a plate thickness of approximately 2 mm. The diffusion sheet 13 is provided separately from the panel unit 20 for the purpose of making a radius of curvature of the diffusion sheet 13 different from a radius of curvature of the panel unit 20. The auxiliary plate 19 shown in FIG. 7 is formed with a curvature larger than the curvature of the panel unit 20.

The auxiliary plate 19 is formed of an acrylic plate having a plate thickness of approximately 2 mm and hence, the auxiliary plate 19 has rigidity thus maintaining the predetermined radius of curvature. The diffusion sheet 13 has a thickness of approximately 0.05 mm and hence, the diffusion sheet 13 is formed in a curved plane in the same manner as the auxiliary plate 19 along the auxiliary plate 19 on which a curved plane is formed. The diffusion sheet 13 and the auxiliary plate 19 are adhered to each other using an adhesive material. Here, the diffusion sheet 13 may be adhered to the auxiliary plate 19 while the auxiliary plate 19 is in a planar state and, thereafter, the auxiliary plate 19 and the diffusion sheet 13 may be curved simultaneously.

In this embodiment, a backlight unit has the substantially same constitution as the backlight unit of the embodiment 1 shown in FIG. 3. According to this embodiment, by setting the radius of curvature of the diffusion sheet 13 larger than the radius of curvature of the liquid crystal display panel 10, the brightness in the screen normal direction can be set to a predetermined value and, at the same time, it is possible to adjust the brightness such that the brightness when the screen is viewed in the oblique direction is prevented from becoming extremely small.

Embodiment 3

Figure 8:
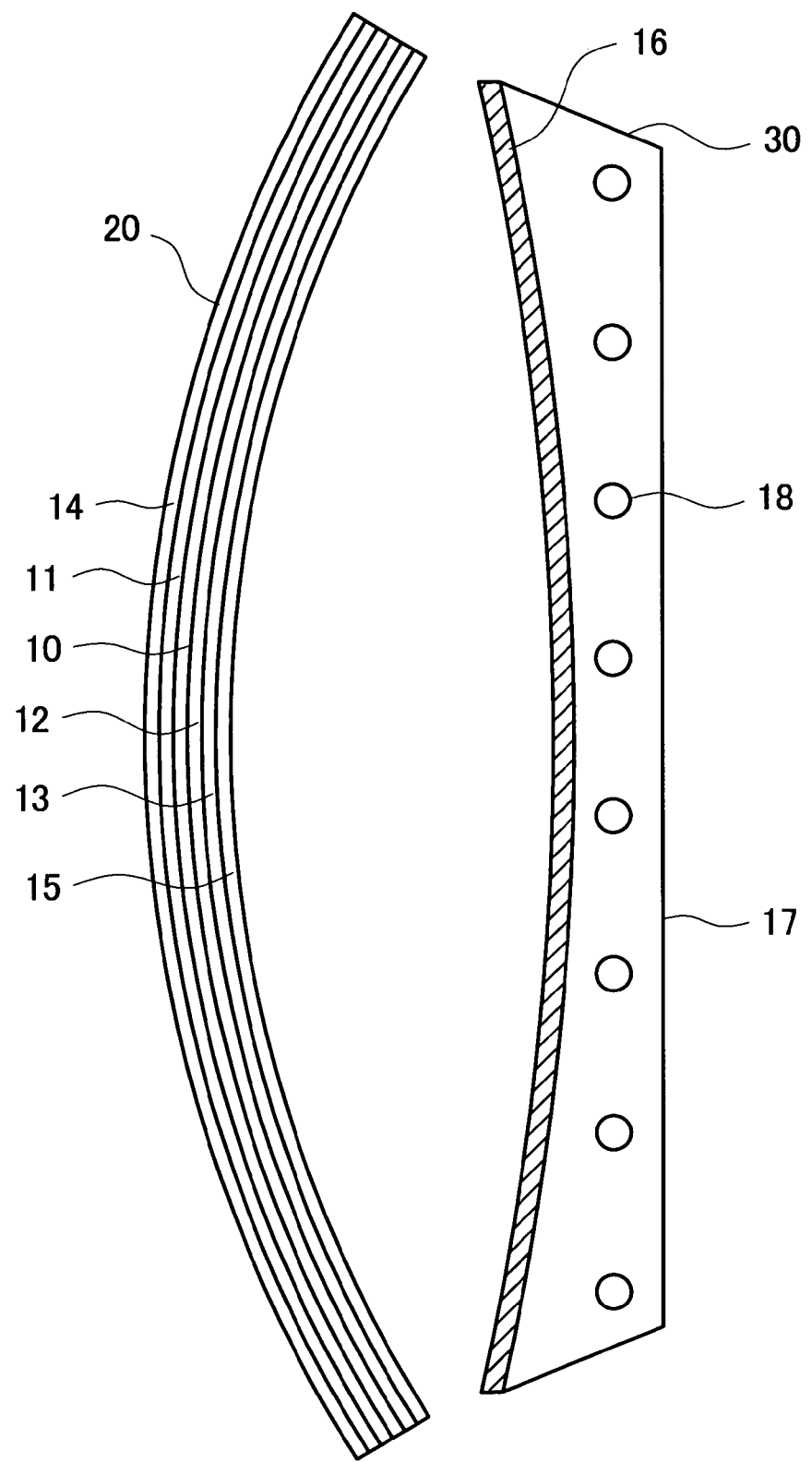
FIG. 8 is a cross-sectional view of a liquid crystal display device of an embodiment 3.

FIG. 8 shows the constitution according to this embodiment. This embodiment is provided for further enhancing the brightness when the screen is viewed in the screen normal direction. The enhancement of brightness here also implies the enhancement of the brightness on a periphery of the screen when the screen is viewed in the screen normal direction. In FIG. 8, a panel unit 20 has the substantially same constitution as the panel unit 20 of the embodiment 1 shown in FIG. 3. The constitution which makes this embodiment different from the embodiment 1 lies in the provision of a diffusion plate 16 of a light source unit 30.

As shown in FIG. 8, in this embodiment, by forming the diffusion plate 16 in a concave curved plane, the brightness in the screen normal direction is further enhanced compared to the corresponding brightness in the screen normal direction in the embodiment 1. The diffusion plate 16 is formed of a poly-carbonate plate having a plate thickness of approximately 2 mm and hence, by forming the diffusion plate 16 in a curved plane using a press or the like, the diffusion plate 16 can maintain the curved plane.

Figure 9A:
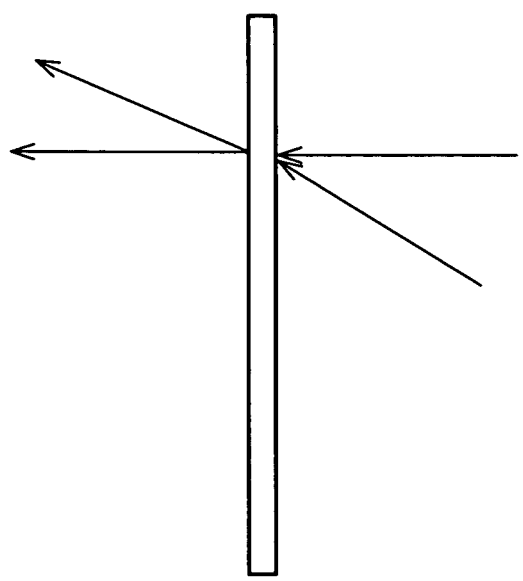
FIG. 9A is a view showing an example of refraction of light by a diffusion plate having a planar plane.
Figure 9B:
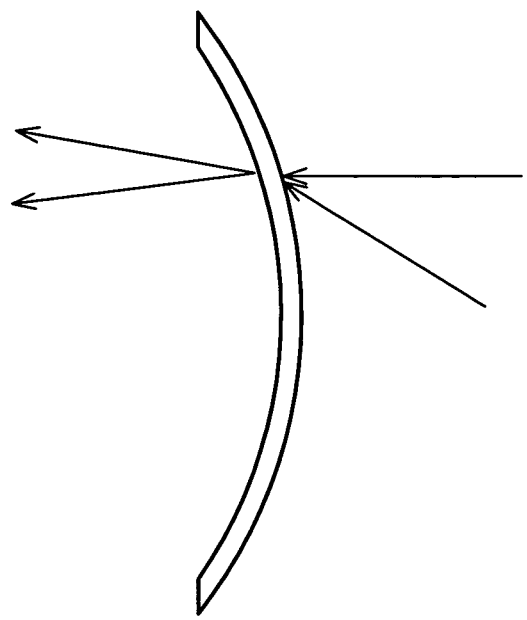
FIG. 9B is a view showing an example of refraction of light by a diffusion plate formed into a concave curved plane.

FIG. 9A shows an optical path when light is incident on the planar diffusion plate 16. When the diffusion plate 16 is formed in a planar plane, the light is merely refracted and the direction of the light is not changed. FIG. 9B shows an optical path when the diffusion plate 16 is formed in a concave curved plane. As can be understood from FIG. 9B, the light is collected to the center of a concave curved plane of the diffusion plate 16. That is, by using the diffusion plate 16 having the concave curved plane as shown in FIG. 8, it is possible to collect the light radiated from the backlight in the direction toward the center of the screen.

Figure 10:
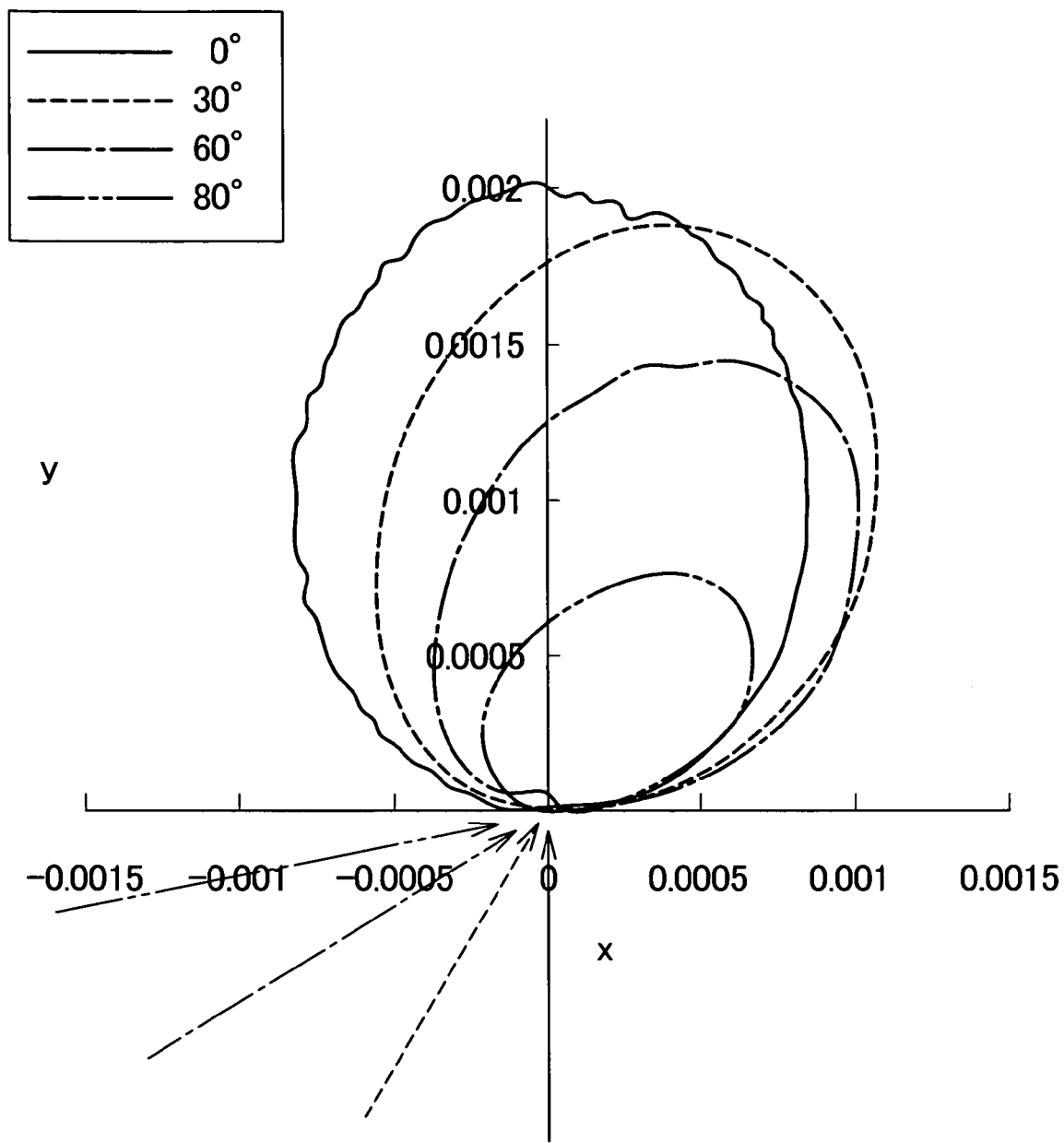
FIG. 10 is a view showing an example of transmissivity characteristic of the diffusion plate.

FIG. 10 shows a transmissivity characteristic of the diffusion plate 16. In FIG. 10, the relative brightness is taken on an axis of ordinates y, and a diffusion surface, that is, the direction of the radiation light is taken on an axis of abscissas x. Scales on both of the y axis and the x axis in FIG. 10 are relative values. In FIG. 10, 0 degree indicated by a solid line shows a case in which the light is incident on the diffusion plate 16 orthogonal to the diffusion plate 16. 30 degrees indicated by a dotted line shows a case in which the light is incident on the diffusion plate 16 in the direction inclined by 30 degrees from the direction orthogonal to the diffusion plate 16. 60 degrees indicated by a chained line shows a case in which the light is incident on the diffusion plate 16 in the direction inclined by 60 degrees from the direction orthogonal to the diffusion plate 16. Further, 80 degrees indicated by a double-dashed chained line shows a case in which the light is incident on the diffusion plate 16 in the direction inclined by 80 degrees from the direction orthogonal to the diffusion plate 16.

In FIG. 10, when the incident angle is 0 degree, the direction of the incident light and the direction of the radiation light are equal to each other and hence, the radiation light receives only a diffusion effect by the diffusion plate 16 whereby a peak of the radiation light becomes smaller than a peak of the incident light. On the other hand, when the incident direction of the light is displaced from the direction orthogonal to the diffusion plate 16, the radiation light receives the diffusion effect and, at the same time, the direction of the radiation light is changed. The change of the direction implies that the direction of the peak of the incident light and the direction of the peak of the radiation light are changed from each other.

The panel unit 20 of this embodiment has the substantially same constitution as the panel unit 20 of the embodiment 1. That is, the diffusion sheet 13 which is formed in a convex surface shape is arranged in the inside of the panel unit 20, and the diffusion sheet 13 collects light radiated from the backlight in the screen normal direction. In this embodiment, as has been explained heretofore, the light radiated from the backlight can be further collected in the direction toward the center of the screen due to the diffusion plate 16 which is formed in a concave surface shape and hence, it is possible to further enhance the brightness in the screen normal direction compared to the brightness in the screen normal direction in the embodiment 1.

Embodiment 4

Figure 11:
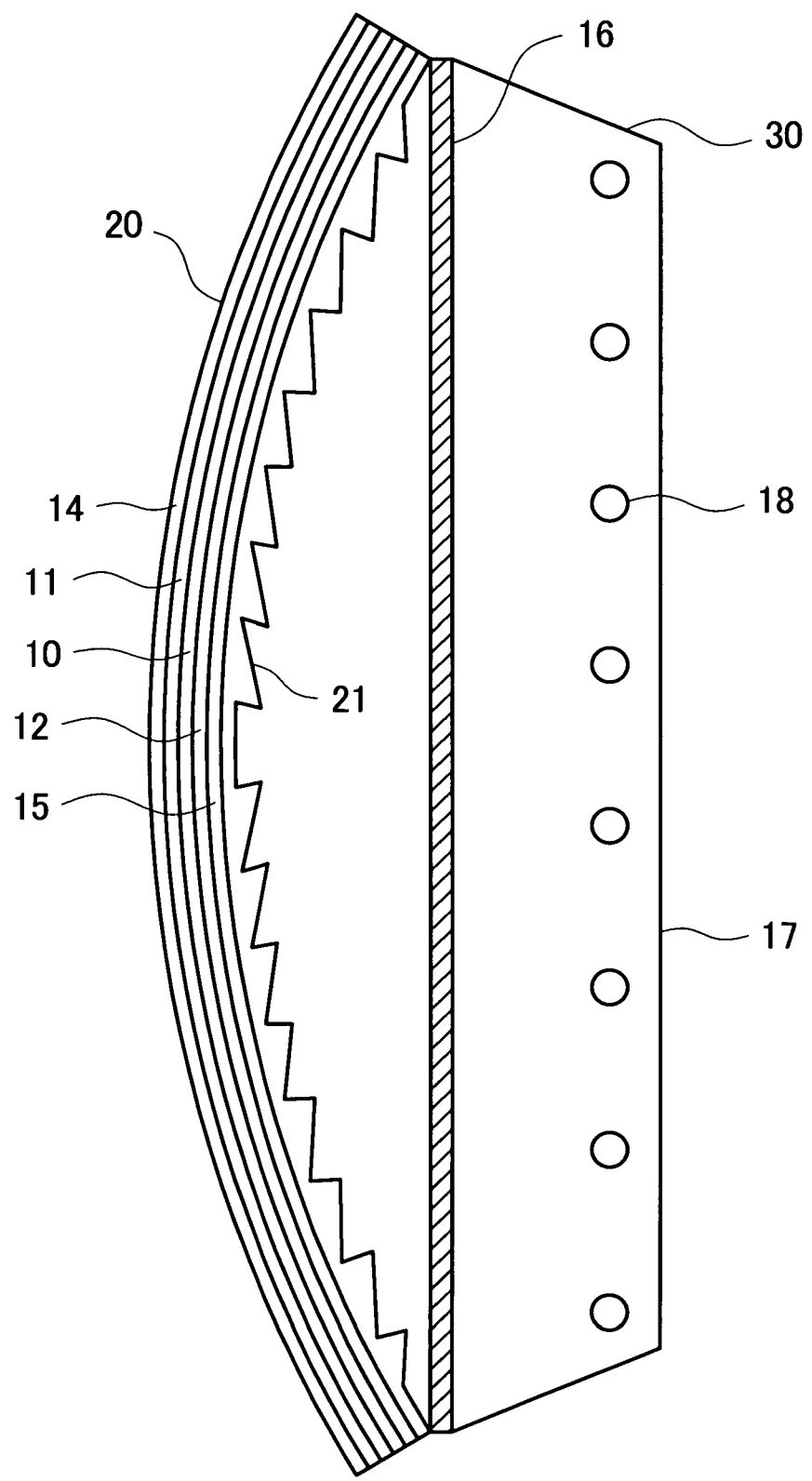
FIG. 11 is a cross-sectional view of a liquid crystal display device of an embodiment 4.

FIG. 11 shows an embodiment 4 of the present invention. In FIG. 11, a panel unit 20 is constituted as follows. That is, in the same manner as the panel unit 20 of the embodiment 1, an upper polarizer 11 and a lower polarizer 12 are adhered to a liquid crystal display panel 10, and a diffusion sheet 13 is arranged below the lower polarizer 12. In this embodiment, the liquid crystal display panel 10 and the like are sandwiched between a front surface plate 14 and a Fresnel lens 21 thus forming the panel unit 20 in a curved plane.

In FIG. 11, in the same manner as the embodiment 1, the front surface plate 14 is made of PET and has a plate thickness of approximately 0.5 mm. In this embodiment, the Fresnel lens 21 is used in place of a back surface plate 15. The Fresnel lens 21 is formed of an acrylic plate having a plate thickness of approximately 2 mm to 4 mm and hence, in the same manner as the back surface plate 15 of the embodiment 1, the Fresnel lens 21 has rigidity. Accordingly, when the Fresnel lens 21 is formed in a curved plane using a press or the like, the Fresnel lens 21 can maintain the curved plane. Further, the liquid crystal display panel 10 and other optical parts are sandwiched between the front surface plate 14 and the Fresnel lens 21 thus exhibiting a predetermined curvature. A light source unit 30 used in this embodiment has the substantially same constitution as the light source unit 30 of the embodiment 1.

Figure 12:
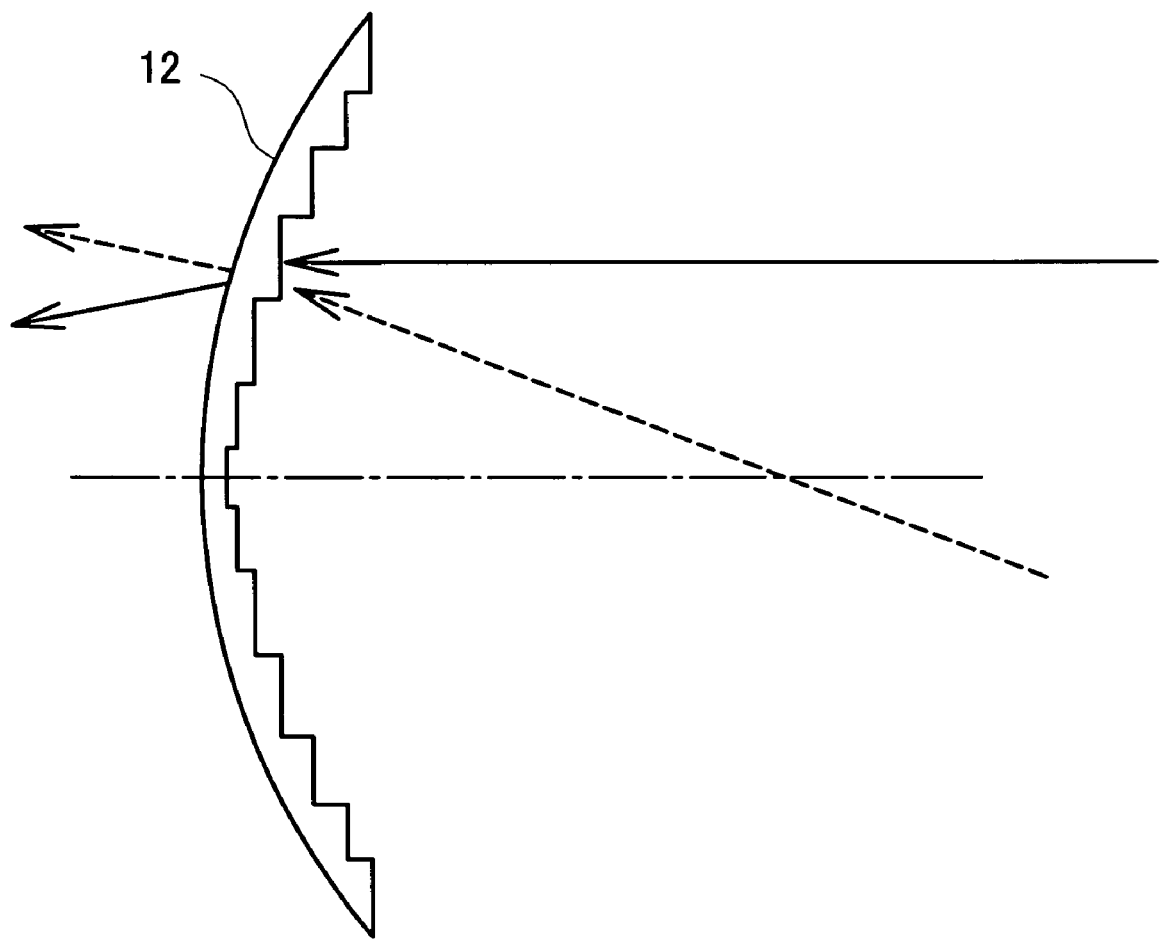
FIG. 12 is a view showing an example of refraction of light by a Fresnel lens.
Figure 21:
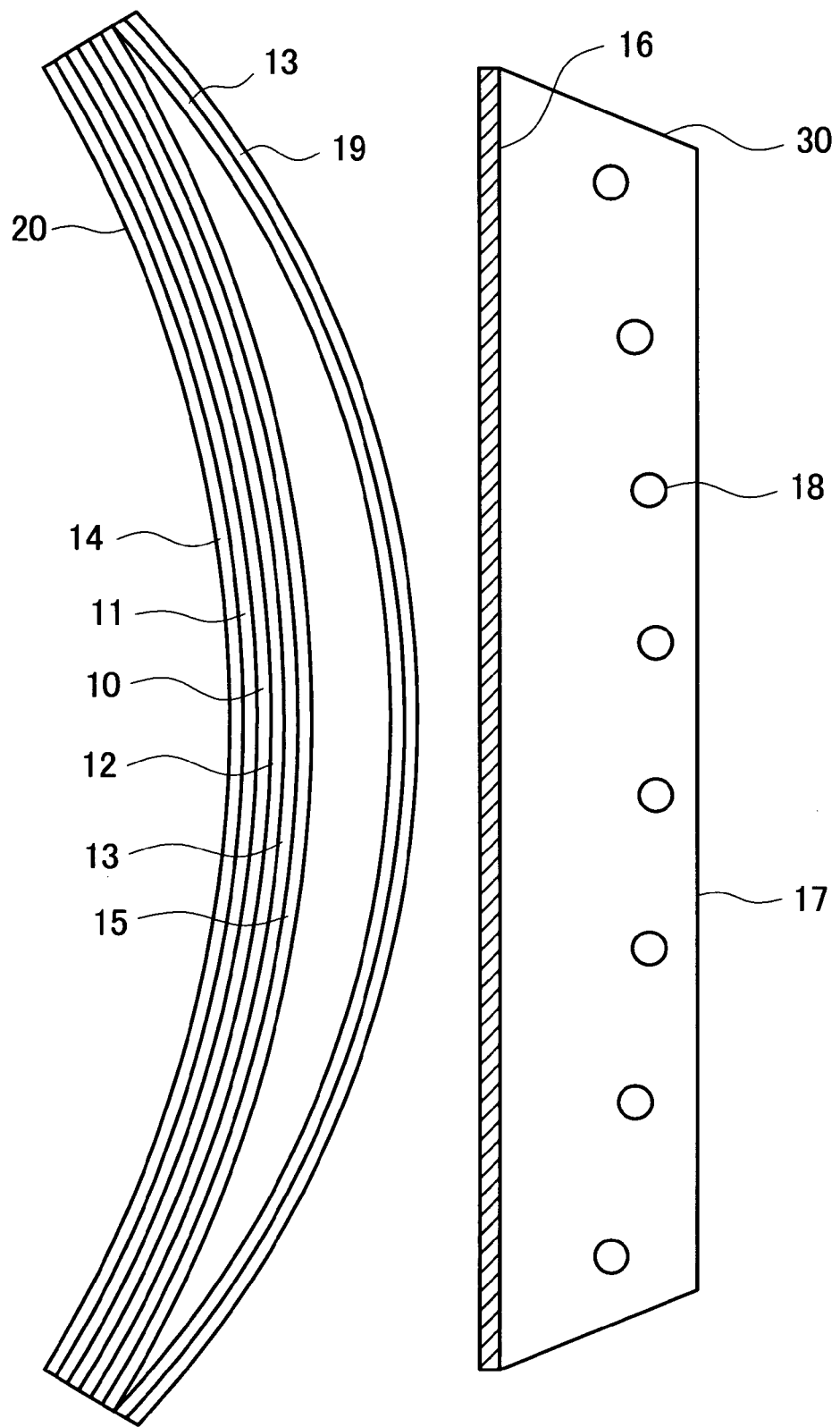
FIG. 21 is a cross-sectional view of a liquid crystal display device of another modification of the embodiment 7.

In this embodiment, the reason that the Fresnel lens 21 is used is as follows. The Fresnel lens 21 has a property of collecting light in the optical axis direction in the same manner as the convex lens. FIG. 12 is a schematic view showing a lens action of the Fresnel lens 21. In FIG. 21, light radiated from the backlight is incident on the Fresnel lens 21 parallel to an optical axis of the Fresnel lens 21. This light receives the lens action of the Fresnel lens 21 and the light is refracted in the optical axis direction.

The diffusion sheet 13 arranged in the inside of the panel unit 20 of this embodiment also, as explained in conjunction with the embodiment 1, bends the light radiated from the backlight in the optical axis direction. Accordingly, in this embodiment, the action of the Fresnel lens 21 and an action of the diffusion sheet 13 overlap with each other and direct the light radiated from the backlight in the normal direction of the screen. Accordingly, in this embodiment, on the convex-shaped screen, it is possible to further enhance the brightness of the screen in the normal direction compared to the brightness of the screen in the normal direction in the embodiment 1.

Embodiment 5

Figure 13:
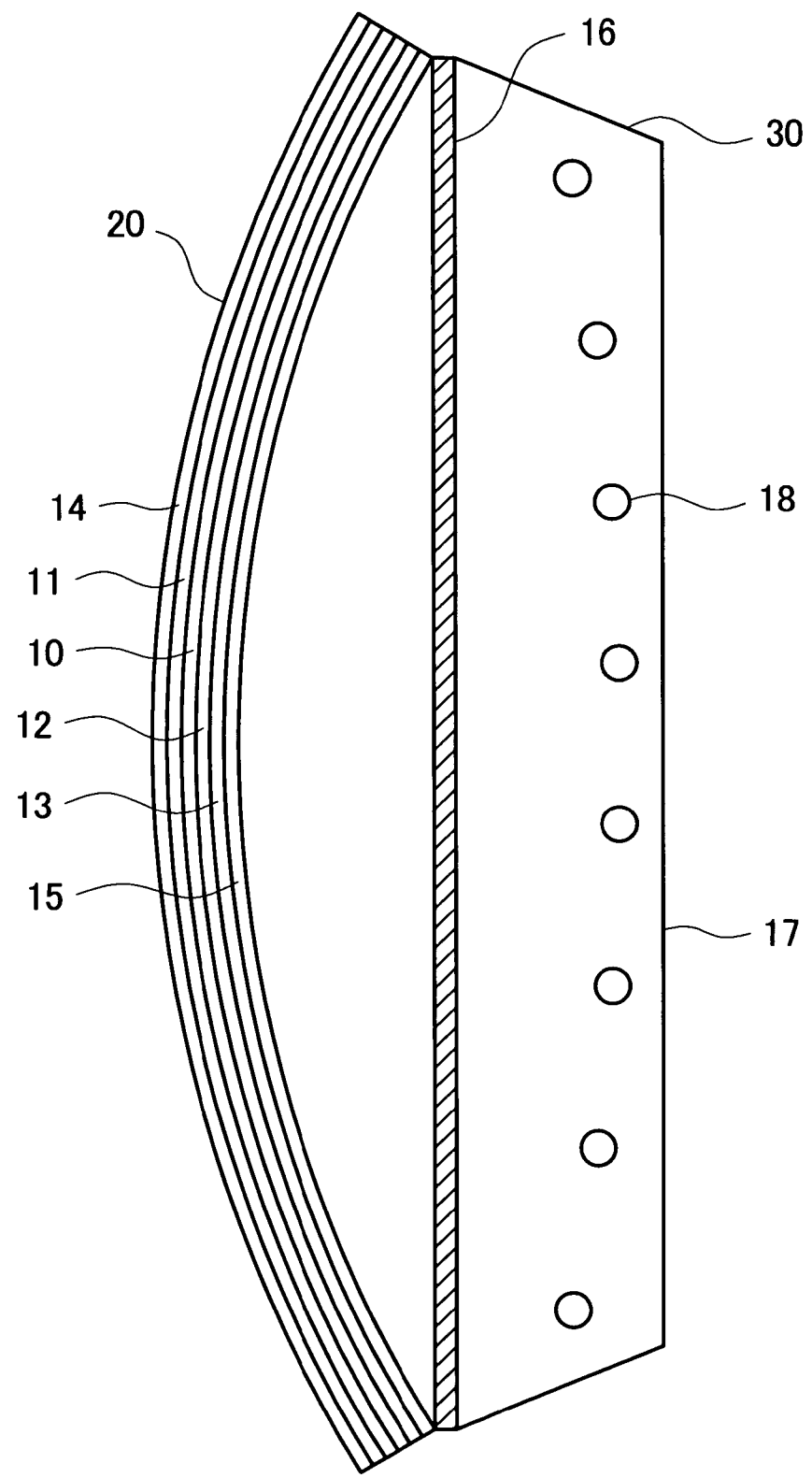
FIG. 13 is a cross-sectional view of a liquid crystal display device of an embodiment 5.

FIG. 13 shows the constitution of this embodiment. In FIG. 13, a panel unit 20 including a liquid crystal display panel 10 has substantially equal constitution as the embodiment 1. That is, by arranging a diffusion sheet 13 having the same curvature as the liquid crystal display panel 10 in the inside of the panel unit 20, it is possible to direct light radiated from a backlight in the normal direction of a screen. Further, the curvature is imparted to the optical parts such as the liquid crystal display panel 10 and the diffusion sheet 13 by sandwiching these optical parts between a front surface plate 14 and a back surface plate 15.

This embodiment differs from the embodiment 1 with respect to a light source unit 30. In this embodiment, fluorescent lamps 18 arranged in the inside of a housing 17 are not arranged on a planar plane but are arranged on a concave-curved plane having a curvature opposite to a curvature of the panel unit 20. By arranging the fluorescent lamps 18 on the concave-curved plane in this manner, it is possible to direct the light further in the normal direction of the screen. Here, a radius of curvature of the curved plane along which the fluorescent lamps are arranged is set larger than the radius of curvature of the panel unit 20. The radius of curvature with which the fluorescent lamps 18 are arranged is determined based on setting of a quantity of light focused on a front surface of the screen. When the radius of curvature with which the fluorescent lamps are arranged is decreased, a distance between the panel unit 20 and the fluorescent lamps 18 becomes small in a periphery of the screen. Due to such an effect, the brightness in the periphery of the screen is elevated and hence, an effect that the brightness in the periphery of the screen is decreased in a convex-shaped screen can be alleviated. That is, according to this embodiment, in addition to the advantageous effect acquired by the embodiment 1, it is possible to acquire an advantageous effect that it is possible to prevent the reduction of brightness in the periphery of the screen when the screen is viewed from a front side on the convex-shaped screen attributed to an effect of the distance between the fluorescent lamps 18 and the panel unit 20.

Figure 14:
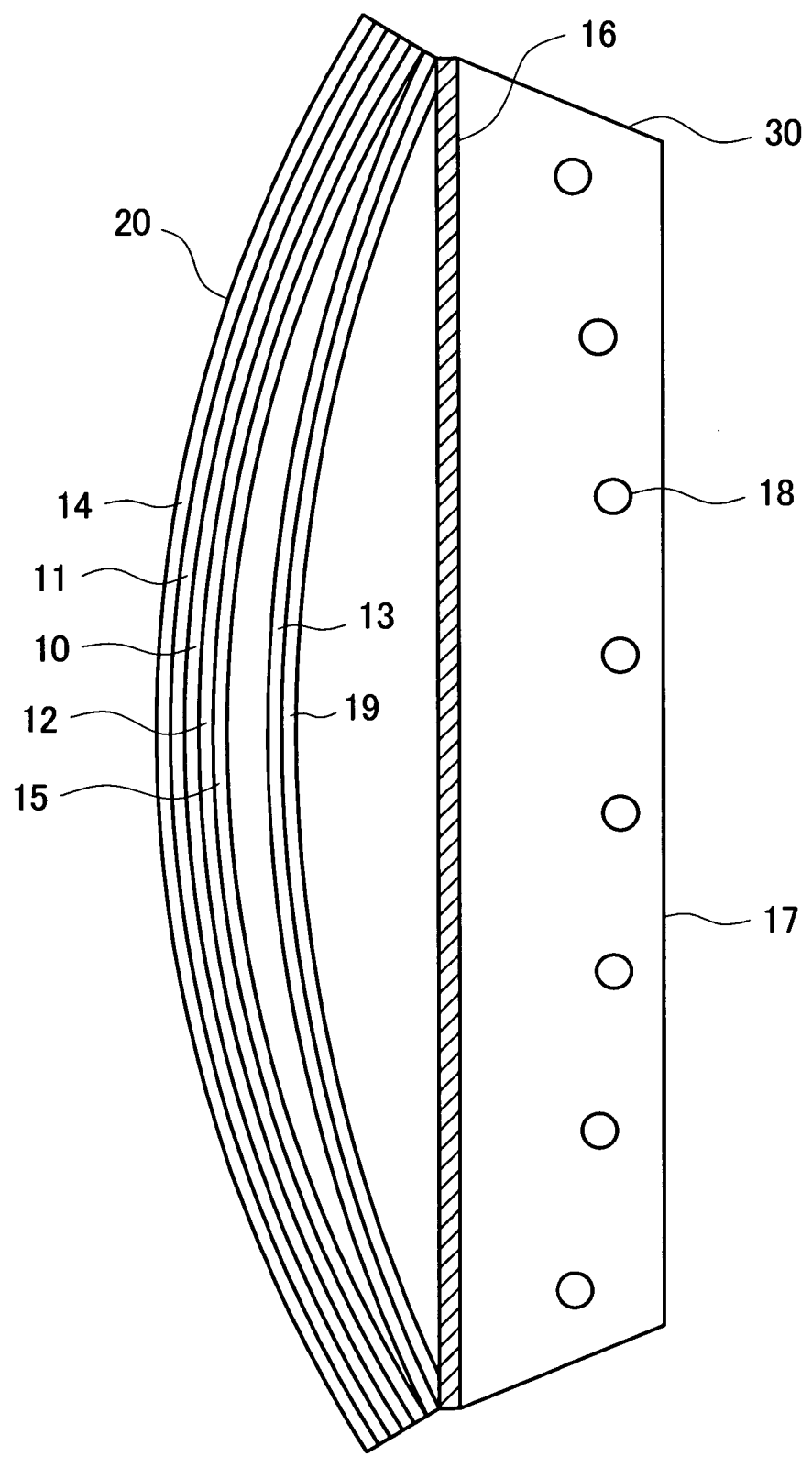
FIG. 14 is a cross-sectional view of a liquid crystal display device of a modification of the embodiment 5.
Figure 15:
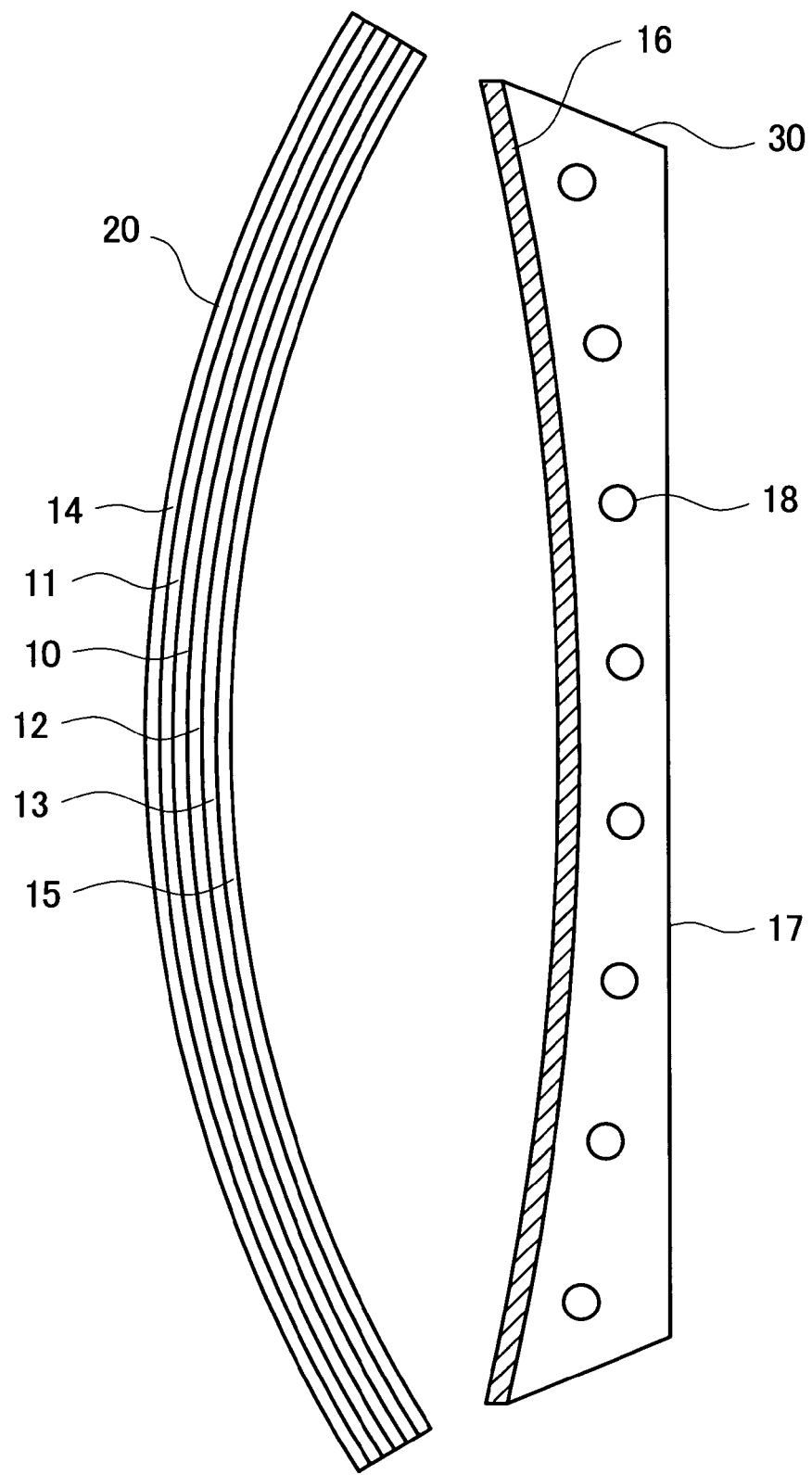
FIG. 15 is a cross-sectional view of a liquid crystal display device of another modification of the embodiment 5.
Figure 16:
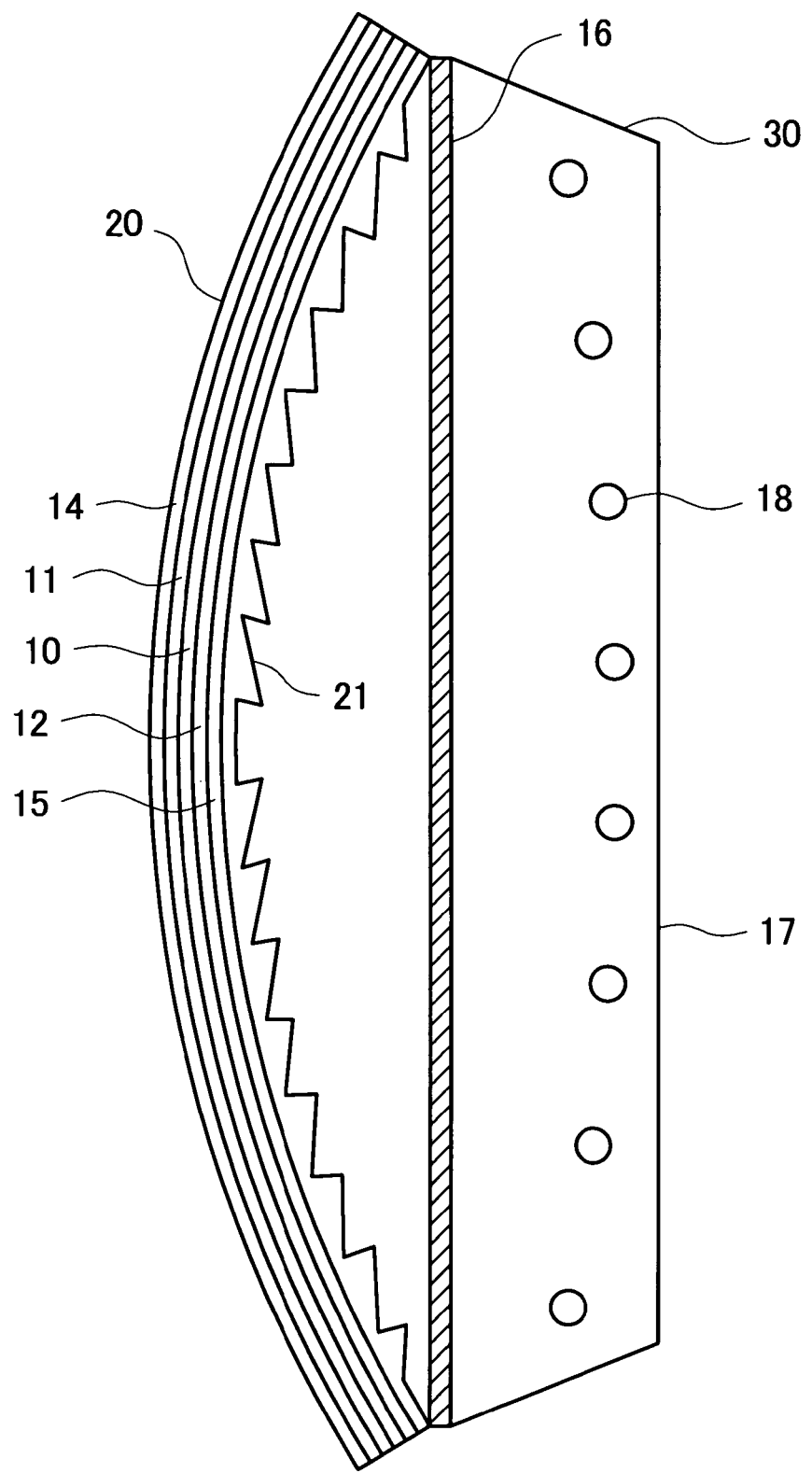
FIG. 16 is a cross-sectional view of a liquid crystal display device of still another modification of the embodiment 5.

The constitutions shown in FIG. 14, FIG. 15 and FIG. 16 are respectively provided by adding the constitution that the fluorescent lamps 18 of the light source unit 30 are arranged on a curved plane to the respective constitutions of the embodiment 2, the embodiment 3 and the embodiment 4.

That is, the constitution shown in FIG. 14 corresponds to the constitution of the embodiment 2 shown in FIG. 7, wherein by arranging the fluorescent lamps 18 on the curved plane, the constitution shown in FIG. 14 can further acquire an advantageous effect that the reduction of brightness in the periphery of the screen when the screen is viewed from a front side can be alleviated.

Further, the constitution shown in FIG. 15 corresponds to the constitution of the embodiment 3 shown in FIG. 8, wherein by arranging the fluorescent lamps 18 on the curved plane, the constitution shown in FIG. 15 can further acquire an advantageous effect that the reduction of brightness in the periphery of the screen when the screen is viewed from a front side can be alleviated.

Still further, the constitution shown in FIG. 16 corresponds to the constitution of the embodiment 4 shown in FIG. 11, wherein by arranging the fluorescent lamps 18 on the curved plane, the constitution shown in FIG. 16 can further acquire an advantageous effect that the reduction of brightness in the periphery of the screen when the screen is viewed from a front side can be alleviated.

Embodiment 6

Figure 17:
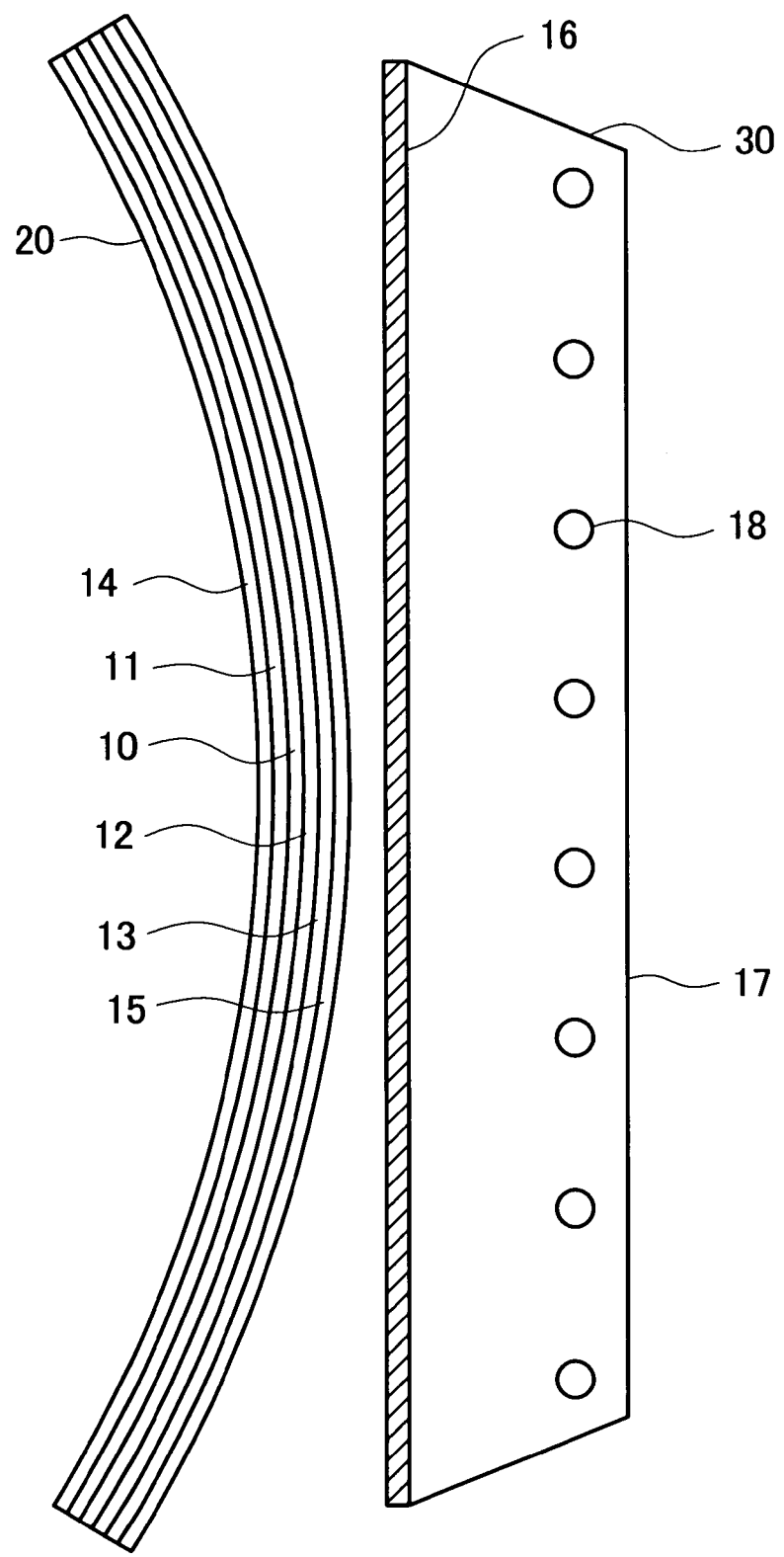
FIG. 17 is a cross-sectional view of a liquid crystal display device of an embodiment 6.

FIG. 17 shows a liquid crystal display device of the embodiment 6 of the present invention. In the embodiment 6 to an embodiment 9, a screen adopts a concave shape. A case which requires a display with a concave screen is a case in which a liquid crystal display device is installed on a wall surface of a train, a bus or the like. Further, when a position at which a viewer views the screen is fixed in the vicinity of the relatively center of the screen, by forming the screen in a concave surface, it is possible to compensate for a viewing angle characteristic of liquid crystal thus forming a clear image up to the periphery of the screen. As a display used in such a case, a vehicle-mounted display, a mobile phone display or the like with which a position where a viewer watches the display is fixed.

Figure 18:
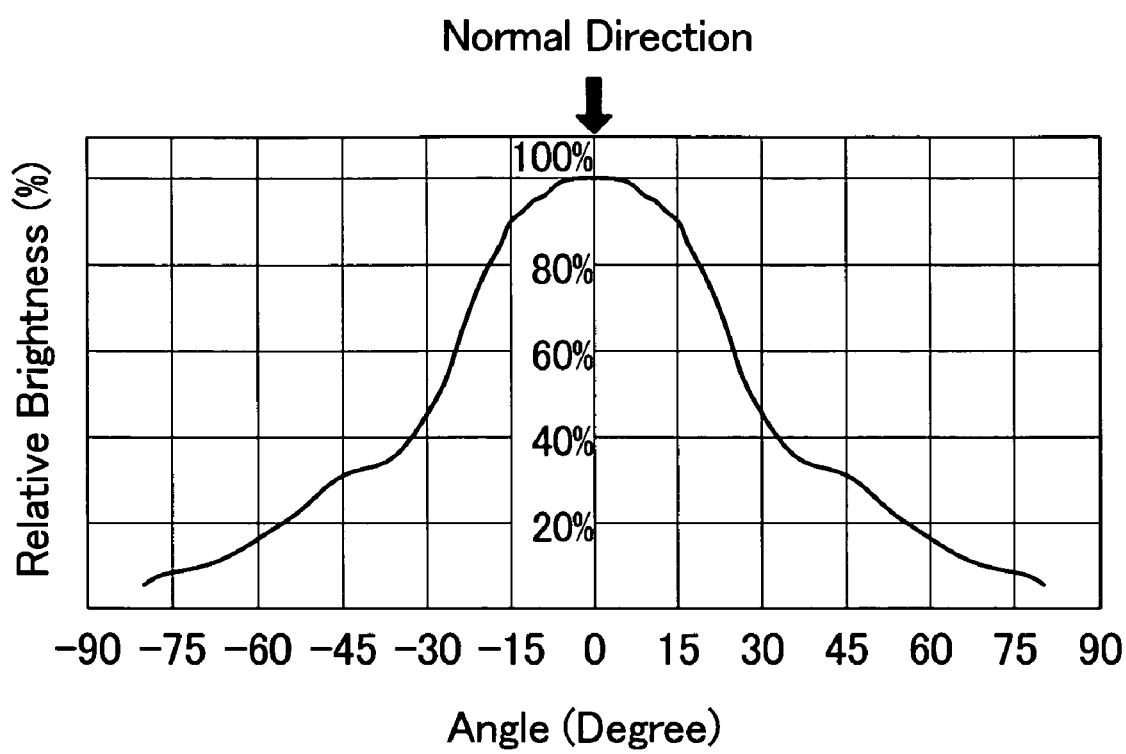
FIG. 18 is a view showing an example of viewing angle characteristic of a liquid crystal display device.

FIG. 18 shows a viewing angle characteristic of the liquid crystal display panel 10. One of drawbacks in image quality of the liquid crystal display panel 10 lies in a change of brightness, chromaticity or the like depending a screen viewing angle. FIG. 18 shows the viewing angle characteristic of a usual TN-type liquid crystal display device. In FIG. 18, brightness is taken on an axis of ordinates, and brightness when the screen is viewed in the direction perpendicular to the screen is set to 100%. An angle at which the screen is viewed is taken on an axis of abscissas. That is, the angle at which the screen is viewed in the direction perpendicular to the screen is set to 0 degree and the angles displaced from the direction perpendicular to the screen are taken on the axis of abscissas. As shown in FIG. 18, when the liquid crystal screen is displaced by 30 degrees from the direction perpendicular to the screen, the brightness is decreased to approximately 40%. Further, the reduction of brightness also differs for every color and there also arises a drawback that color is changed depending on a viewing angle.

However, as shown in FIG. 17, by forming the screen into a concave surface, the viewing angle can be made to approximate 90 degrees also in the vicinity of the screen and hence, it is also possible to acquire a clear image also in the periphery of the screen. Even when the screen is formed in a concave shape, there a rises a phenomenon that the brightness is decreased in the periphery of the screen. This embodiment copes with the reduction of the brightness in the periphery of the screen by arranging the curved diffusion sheet 13 in the inside of the panel unit 20.

In FIG. 17, a lower polarizer 12 and an upper polarizer 11 are adhered to the liquid crystal display panel 10. A diffusion sheet 13 is arranged below the lower polarizer 12. The liquid crystal display panel 10, these optical sheets and the like are sandwiched between a front surface plate 14 and a back surface plate 15 and are formed into a predetermined curved plane. Although this constitution is substantially equal to the constitution described in the embodiment 1 shown in FIG. 3, the direction of the curvature in this embodiment differs from the direction of the curvature in the embodiment 1.

As explained in conjunction with FIG. 9, the curved diffusion sheet 13 has a light collecting action. Although the explanation is made with respect to the diffusion plate 16 in conjunction with FIG. 9, the diffusion sheet 13 of this embodiment is substantially equal to the diffusion sheet 13 shown in FIG. 9. The light source unit 30 is substantially equal to the light source unit 30 shown in FIG. 3. That is, a plurality of fluorescent lamps 18 which are arranged in plane are arranged in the inside of a housing 17, and an upper portion of the housing 17 is covered with the diffusion plate 16. In this manner, according to the constitution of this embodiment, light radiated from a backlight is collected in the center direction of the screen and hence, a phenomenon that the periphery of the screen is darkened can be suppressed.

In this manner, according to this embodiment, coupled with an advantageous effect that a change of chromaticity of the brightness characteristic attributed to a viewing angle characteristic of liquid crystal by forming the panel unit 20 in a concave curved plane toward a viewer, it is possible to reduce a phenomenon that the brightness is deteriorated in the periphery of the screen by the light collecting action.

Figure 19:
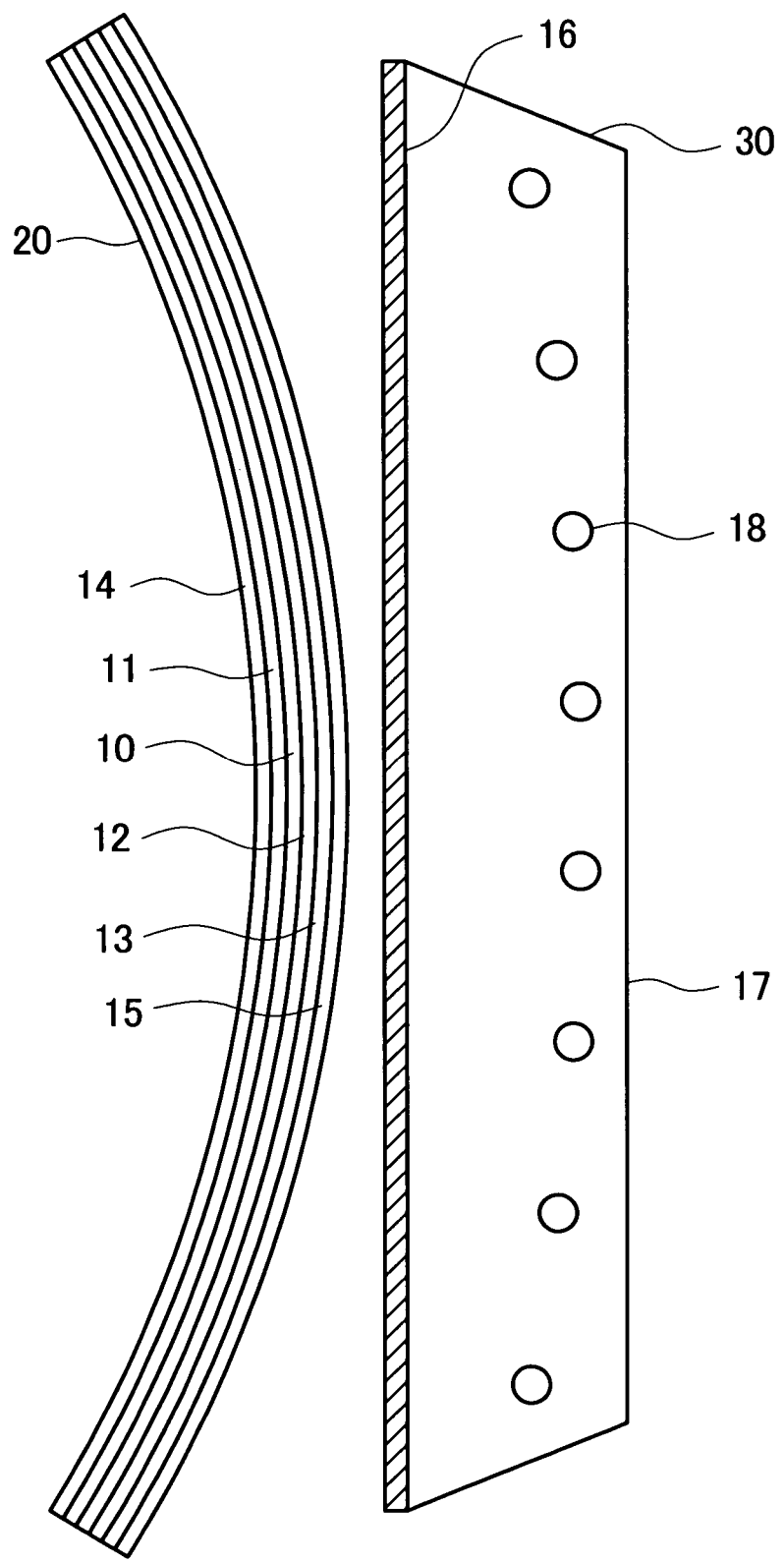
FIG. 19 is a cross-sectional view of a liquid crystal display device of another modification of the embodiment 6.

FIG. 19 shows another modification of this embodiment. In FIG. 19, this modification is substantially equal to this embodiment shown in FIG. 17 except for that the fluorescent lamps 18 in the light source unit 30 are not arranged in a planar plane but are arranged in a curved plane. As shown in FIG. 19, by arranging the fluorescent lamps 18 in a curved plane, it is possible to make the distance between the fluorescent lamps 18 and the liquid crystal display panel 10 narrower in the periphery of the screen. When the screen is formed in a concave shape, the liquid crystal display panel 10 becomes away from the light source and this causes the deterioration of brightness in the periphery of the screen. By arranging the fluorescent lamps 18 in a curved plane as in the case of this modification, it is possible to prevent a phenomenon that the brightness of the screen is decreased due to a drawback on the distance between the fluorescent lamps 18 and the liquid crystal display panel 10 in the periphery of the screen.

Embodiment 7

Figure 20:
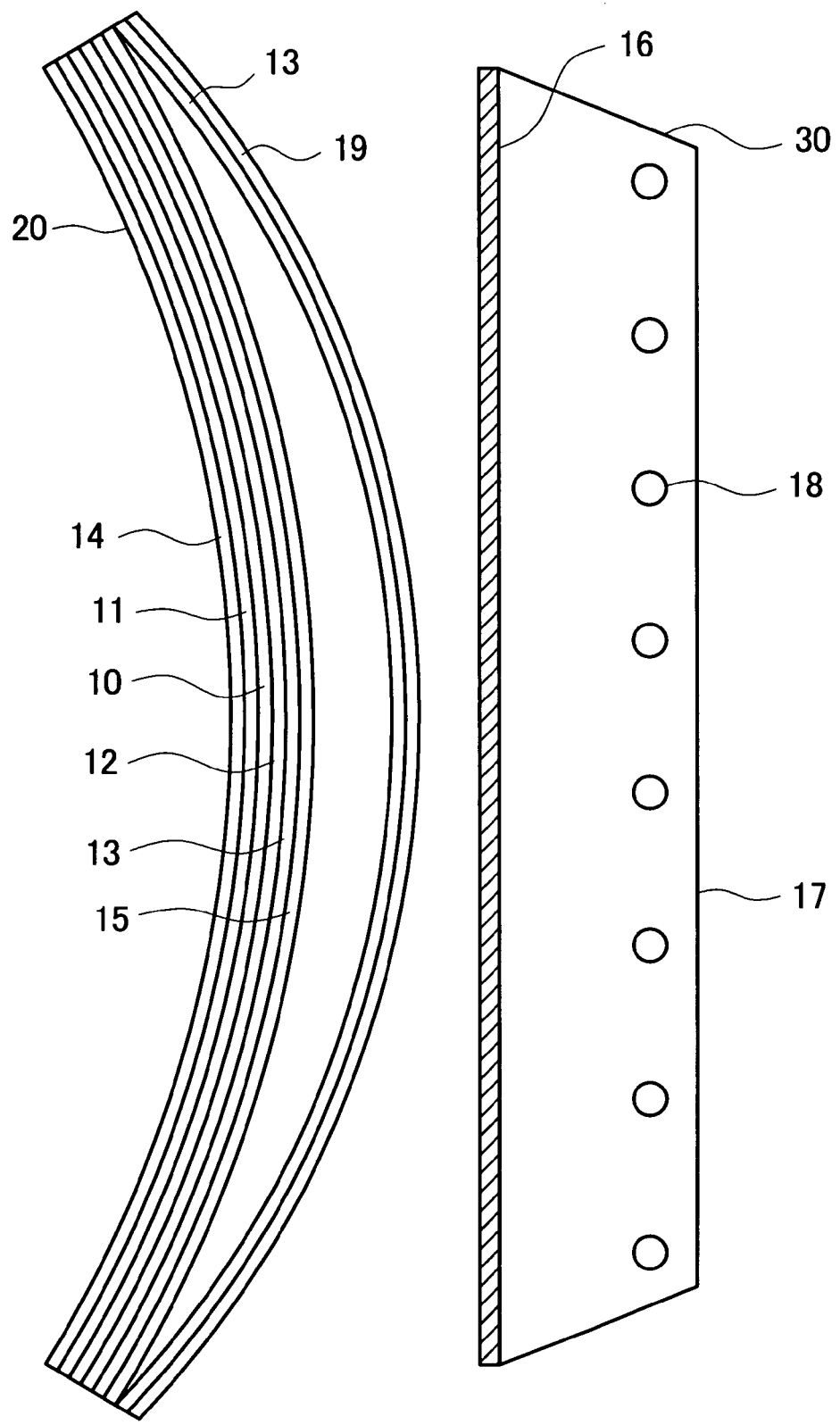
FIG. 20 is a cross-sectional view of a liquid crystal display device of an embodiment 7.

FIG. 20 shows the constitution of the embodiment 7 of the present invention. In FIG. 20, a panel unit 20 is curved in a concave shape. Different from the embodiment 6, the panel unit 20 does not include the diffusion sheet 13 and the diffusion sheet 13 is arranged separately from the panel unit 20. That is, the panel unit 20 is configured such that a polarizer is adhered to upper and lower surfaces of the liquid crystal display panel 10 respectively, and the polarizer-adhered liquid crystal display panel 10 is sandwiched between a front surface plate 14 having a curved plane and a back surface plate 15 having a curved plane thus forming the panel unit 20 in a curved plane. A light source unit 30 of this embodiment is substantially equal to the light source unit 30 of the embodiment 6.

By adhering the diffusion sheet 13 to the auxiliary plate 19, the curved plane formed on the auxiliary plate 19 is formed on the diffusion sheet 13. A method of mounting the diffusion sheet 13 on the auxiliary plate 19 is the corresponding mounting method explained in the embodiment 2 except for that the curvature of the curved plane differs from the curvature of the curved plane used in the embodiment 2. A radius of curvature of the diffusion sheet 13 is smaller than a radius of curvature of the panel unit 20. Accordingly, an action of collecting light radiated from a light source in the direction toward the center of a screen is larger than the corresponding action of the embodiment 6.

FIG. 21 shows another embodiment of the present invention. In FIG. 21, except for that fluorescent lamps 18 in a light source unit 30 are not formed in a planar plane but are formed in a curved plane, the constitution of this embodiment is substantially equal to the constitution shown in FIG. 20. In FIG. 21, the fluorescent lamps 18 are arranged to approach the liquid crystal display panel 10 in a periphery of a screen. That is, compared to the case in which the fluorescent lamps 18 are arranged in a planar plane, the distance between the liquid crystal display panel 10 and the fluorescent lamps 18 in the periphery of the screen is small and hence, it is possible to suppress the reduction of brightness in the periphery of the screen.

The arrangement of the fluorescent lamps 18 is particularly advantageous in the case of this embodiment where the liquid crystal display panel 10 is curved in a concave shape. This embodiment can further suppress the reduction of brightness in the periphery of the screen compared to the embodiment shown in FIG. 20.

The above-mentioned embodiments are explained with respect to the case in which one diffusion sheet 13 is used. However, various optical sheets can be used depending on necessities. For example, a diffusion effect can be enhanced by using a plurality of diffusion sheets 13. Further, due to a lens effect which can be obtained with the use of the plurality of diffusion sheets 13, an action of collecting light radiated from the backlight to the vicinity of the center of a screen can be increased. Further, with the use of a prism sheet which forms prisms at small intervals, a light collecting action in the direction orthogonal to a curved plane of the screen can be enhanced. It is needless to say that not only one prism sheet but also a plurality of prism sheets can be used. Here, the prism sheet has a thickness of 0.1 mm or less and, in the same manner as the diffusion sheet 13, can be easily formed in conformity with a curvature of the front surface plate 14 or the back surface plate 15.

What is claimed is:

1. A liquid crystal liquid crystal display device comprising:
a liquid crystal display panel;
a diffusion plate; and
a plurality of light sources, wherein
the liquid crystal display panel which is formed into an outward convex shape is provided with a diffusion sheet which is formed into an outward convex shape and is arranged over a back surface of the display panel, the diffusion plate is arranged over a back surface of the diffusion sheet, the plurality of light sources is arranged over a back surface of the diffusion plate, and a radius of curvature of the diffusion sheet is larger than a radius of curvature of the liquid crystal display panel.

2. A liquid crystal display device according to claim 1, wherein the plurality of light sources is arranged in plane.

3. A liquid crystal display device according to claim 1, wherein the plurality of light sources is arranged along curved surface, and the curved surface is recessed as viewed from the outside of a screen.

4. A liquid crystal display device comprising:
a liquid crystal display panel;
a diffusion plate; and
a plurality of light sources, wherein
the liquid crystal display panel which is formed into an outward concave shape is provided with a diffusion sheet which is formed into an outward concave shape and is arranged over a back surface of the display panel, the diffusion plate is arranged over a back surface of the diffusion sheet, the plurality of light sources is arranged over a back surface of the diffusion plate, and a radius of curvature of the diffusion sheet is smaller than a radius of curvature of the liquid crystal display panel.

5. A liquid crystal display device according to claim 4, wherein the plurality of light sources is arranged in plane.

6. A liquid crystal display device according to claim 4, wherein the plurality of light sources is arranged along curved surface, and the curved plane is recessed as viewed from the outside of a screen.

* * * * *